(12) United States Patent
Yang et al.

(10) Patent No.: US 11,472,828 B2
(45) Date of Patent: Oct. 18, 2022

(54) INDACENE BASED METALLOCENE CATALYSTS USEFUL IN THE PRODUCTION OF PROPYLENE POLYMERS

(71) Applicant: ExxonMobil Chemical Patents Inc., Baytown, TX (US)

(72) Inventors: Jian Yang, Houston, TX (US); Peijun Jiang, Katy, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 8 days.

(21) Appl. No.: 17/067,222

(22) Filed: Oct. 9, 2020

(65) Prior Publication Data

US 2021/0107930 A1 Apr. 15, 2021

Related U.S. Application Data

(60) Provisional application No. 62/914,209, filed on Oct. 11, 2019.

(51) Int. Cl.
| | |
|---|---|
| *C07F 17/00* | (2006.01) |
| *C08F 4/6592* | (2006.01) |
| *C08F 210/06* | (2006.01) |
| *C08F 2/04* | (2006.01) |
| *C08F 4/659* | (2006.01) |
| *C08F 110/06* | (2006.01) |

(52) U.S. Cl.
CPC ........... *C07F 17/00* (2013.01); *C08F 2/04* (2013.01); *C08F 4/65908* (2013.01); *C08F 4/65927* (2013.01); *C08F 110/06* (2013.01); *C08F 210/06* (2013.01)

(58) Field of Classification Search
CPC ..... C07F 17/00; C08F 4/65927; C08F 210/16
See application file for complete search history.

(56) References Cited

U.S. PATENT DOCUMENTS

| | | | |
|---|---|---|---|
| 4,701,432 A | 10/1987 | Wellborn, Jr. | 502/113 |
| 5,049,535 A | 9/1991 | Resconi et al. | 502/117 |
| 5,077,255 A | 12/1991 | Wellborn, Jr. | 502/104 |
| 5,135,526 A | 8/1992 | Zinnanti et al. | 606/49 |
| 5,276,208 A | 1/1994 | Winter et al. | 556/53 |
| 5,278,264 A | 1/1994 | Spaleck et al. | 526/127 |
| 5,382,630 A | 1/1995 | Stehling et al. | 525/240 |
| 5,382,631 A | 1/1995 | Stehling et al. | 525/240 |
| 5,459,117 A | 10/1995 | Ewen | 502/117 |
| 5,516,848 A | 5/1996 | Canich et al. | 525/240 |
| 5,532,396 A | 7/1996 | Winter et al. | 556/11 |
| 5,543,373 A | 8/1996 | Winter et al. | 502/103 |
| 5,585,509 A | 12/1996 | Langhauser et al. | 556/11 |

(Continued)

FOREIGN PATENT DOCUMENTS

| | | | |
|---|---|---|---|
| EP | 0834519 A1 | 3/2002 | C08F 4/642 |
| WO | WO1998/027103 | 6/1998 | C07F 17/00 |

(Continued)

OTHER PUBLICATIONS

U.S. Appl. No. 14/572,195, filed Dec. 16, 2014, Yang, J. et al.

(Continued)

*Primary Examiner* — Caixia Lu

(57) ABSTRACT

This invention relates homogeneous (typically solution) polymerization of propylene and optional olefin comonomer using metallocene catalyst compounds having a 1,5,6,7-tetrahydro-s-indacenyl moiety bridged to another indacenyl moiety or bridged to a substituted or unsubstituted indenyl moiety.

9 Claims, 1 Drawing Sheet

(56) References Cited

U.S. PATENT DOCUMENTS

| | | | |
|---|---|---|---|
| 5,631,202 A | 5/1997 | Ewen | 502/117 |
| 5,696,045 A | 12/1997 | Winter et al. | 502/113 |
| 5,700,886 A | 12/1997 | Winter et al. | 526/119 |
| 5,770,753 A | 6/1998 | Kuber et al. | 556/11 |
| 5,786,432 A | 7/1998 | Kuber et al. | 526/127 |
| 5,840,644 A | 11/1998 | Kuber et al. | 502/117 |
| 5,869,584 A | 2/1999 | Winter et al. | 526/127 |
| 6,051,727 A | 4/2000 | Kuber et al. | 556/11 |
| 6,069,213 A | 5/2000 | Nemzek et al. | 526/113 |
| 6,121,182 A | 9/2000 | Okumura et al. | 502/152 |
| 6,150,481 A | 11/2000 | Winter et al. | 526/118 |
| 6,207,606 B1 | 3/2001 | Lue et al. | 502/113 |
| 6,242,544 B1 | 6/2001 | Kuber et al. | 526/127 |
| 6,255,506 B1 | 7/2001 | Kuber et al. | 556/11 |
| 6,399,533 B2 | 6/2002 | Sacchettum et al. | 502/125 |
| 6,420,507 B1 | 7/2002 | Kale et al. | 526/348 |
| 6,444,833 B1 | 9/2002 | Ewen et al. | 556/11 |
| 6,492,465 B1 | 12/2002 | Burkhardt et al. | 525/247 |
| 6,559,252 B1 | 5/2003 | Horton et al. | 526/160 |
| 6,608,224 B2 | 8/2003 | Resconi et al. | 556/27 |
| 6,613,713 B2 | 9/2003 | Becke et al. | 502/104 |
| 6,635,779 B1 | 10/2003 | Ewen et al. | 556/11 |
| 6,656,866 B2 | 12/2003 | Wenzel et al. | 502/117 |
| 6,664,348 B2 | 12/2003 | Speca | 526/133 |
| 6,841,501 B2 | 1/2005 | Resconi et al. | 502/117 |
| 6,846,770 B2 | 1/2005 | Speca | 502/104 |
| 6,878,786 B2 | 4/2005 | Resconi et al. | 526/127 |
| 6,949,614 B1 | 9/2005 | Schottek et al. | 526/160 |
| 6,953,829 B2 | 10/2005 | Kratzer et al. | 526/160 |
| 7,034,173 B2 | 4/2006 | Schottek | 556/179 |
| 7,122,498 B2 | 10/2006 | Hart et al. | 502/152 |
| 7,141,527 B1 | 11/2006 | Van Baar et al. | 502/154 |
| 7,141,632 B2 | 11/2006 | Vaughan et al. | 526/114 |
| 7,192,902 B2 | 3/2007 | Brinen et al. | 502/129 |
| 7,314,903 B2 | 1/2008 | Resconi et al. | 526/134 |
| 7,342,078 B2 | 3/2008 | Schottek et al. | 526/160 |
| 7,355,058 B2 | 4/2008 | Luo et al. | 556/179 |
| 7,385,015 B2 | 6/2008 | Holtcamp | 526/160 |
| 7,405,261 B2 | 7/2008 | Schulte et al. | 526/170 |
| 7,452,949 B2 | 11/2008 | Okumura et al. | 526/160 |
| 7,569,651 B2 | 8/2009 | Schottek et al. | 526/348 |
| 7,615,597 B2 | 11/2009 | Resconi et al. | 526/162 |
| 7,799,880 B2 | 9/2010 | Ciaccia | 526/161 |
| 7,829,495 B2 | 11/2010 | Floyd et al. | 502/152 |
| 7,964,679 B2 | 6/2011 | Resconi et al. | 526/127 |
| 7,985,799 B2 | 7/2011 | Resconi et al. | 525/53 |
| 8,088,867 B2 | 1/2012 | Jiang et al. | 525/240 |
| 8,110,518 B2 | 2/2012 | Marin et al. | 502/119 |
| 8,222,356 B2 | 7/2012 | Kipke et al. | 526/115 |
| 8,507,706 B2 | 8/2013 | Dimeska et al. | 556/53 |
| 8,575,284 B2 | 11/2013 | Luo et al. | 526/165 |
| 8,598,061 B2 | 12/2013 | Yang et al. | 502/113 |
| 8,815,357 B1 | 8/2014 | Inn et al. | C08F 10/00 |
| 9,193,856 B2 | 11/2015 | Ebata et al. | C08L 23/16 |
| 9,266,910 B2 | 2/2016 | McCullough | C07F 7/00 |
| 9,458,254 B2 | 10/2016 | Canich et al. | C08F 4/65912 |
| 9,796,795 B2 | 10/2017 | Canich et al. | C08F 4/76 |
| 9,803,037 B1 | 10/2017 | Canich et al. | C08F 10/00 |
| 2001/0053833 A1 | 12/2001 | Nakano et al. | 526/127 |
| 2002/0007023 A1 | 1/2002 | McDaniel et al. | 526/64 |
| 2005/0182266 A1 | 8/2005 | Schulte et al. | 556/11 |
| 2005/0288461 A1 | 12/2005 | Jensen et al. | 526/127 |
| 2006/0009595 A1 | 1/2006 | Rix et al. | 526/129 |
| 2006/0025545 A1 | 2/2006 | Brant et al. | 526/64 |
| 2006/0293474 A1 | 12/2006 | Brant et al. | 526/134 |
| 2010/0267907 A1 | 10/2010 | Dimeska et al. | 526/126 |
| 2011/0230630 A1 | 9/2011 | Sell et al. | 526/126 |
| 2012/0130032 A1 | 5/2012 | Hussein et al. | 526/131 |
| 2014/0031504 A1 | 1/2014 | Jacobsen et al. | 526/127 |
| 2015/0025205 A1 | 1/2015 | Jian et al. | 526/126 |
| 2015/0025208 A1 | 1/2015 | Yang et al. | 526/127 |
| 2016/0032025 A1 | 2/2016 | Giesbrecht | C08F 10/02 |
| 2017/0015767 A1 | 1/2017 | Canich et al. | C08F 210/02 |
| 2017/0342175 A1 | 11/2017 | Hagadorn et al. | C08F 110/06 |
| 2017/0362350 A1 | 12/2017 | Canich et al. | C08F 4/76 |
| 2018/0094088 A1 | 4/2018 | Crowther et al. | C08F 210/02 |
| 2018/0171040 A1 | 6/2018 | Ye et al. | C08F 10/02 |
| 2019/0119418 A1 | 4/2019 | Yang et al. | C08F 210/14 |
| 2019/0161560 A1 | 5/2019 | Yang et al. | C08F 4/65927 |
| 2019/0263953 A1 | 8/2019 | Li et al. | C08F 210/16 |
| 2019/0284311 A1 | 9/2019 | Canich et al. | C08F 4/6592 |
| 2019/0292282 A1 | 9/2019 | Yang et al. | C08F 210/16 |

FOREIGN PATENT DOCUMENTS

| | | | |
|---|---|---|---|
| WO | WO2001/042315 | 6/2001 | C08F 4/643 |
| WO | WO2001/058970 | 8/2001 | C08F 297/08 |
| WO | WO2002/002575 | 1/2002 | C07F 17/00 |
| WO | WO2002/002576 | 1/2002 | C07F 17/00 |
| WO | WO2002/022575 | 3/2002 | C07D 207/16 |
| WO | WO2003/025027 | 3/2003 | C08F 10/00 |
| WO | WO2003/045551 | 6/2003 | B01J 31/16 |
| WO | WO2004/013149 | 2/2004 | C07F 7/28 |
| WO | WO2004/052945 | 6/2004 | C08F 4/64 |
| WO | WO2004/106351 | 12/2004 | C07F 17/00 |
| WO | WO2005/075525 | 8/2005 | C08F 110/00 |
| WO | WO2007/080365 | 7/2007 | C08F 4/659 |
| WO | WO2012/006272 | 1/2012 | C08F 4/76 |

OTHER PUBLICATIONS

U.S. Appl. No. 15/145,320, filed May 3, 2016, Canich, Jo Ann M. et al.

Amaya, T. et al. (2014) "Sumanenyl Metallocenes: Synthesis and Structure of Mono- and Trinuclear Zirconocene Complexes" Journal of the American Chemical Society, v.136(36), pp. 12794-12798.

Hong, S. C. et al. (2007) "Immobilized Me2Si(C5Me4)(N-tBu)TiCl2/(nBuCp)2ZrCl2 Hybrid Metallocene Catalyst System for the Production of Poly(ethylene-co-hexene) with Pseudo-Bimodal Molecular Weight and Inverse Comonomer Distribution," Polymer Engineering and Science, v.47(2), pp. 131-139.

Iedema, P. D. et al. (2004) "Predicting the Molecular Weight Distribution of Polyethylene for Mixed Systems with a Constrained-Geometry Metallocene Catalyst in a Semibatch Reactor," Ind. Eng. Chem. Res., v.43(1), pp. 36-50.

Kim, J. D. et al. (2000) "Copolymerization of Ethylene and α-Olefins with Combined Metallocene Catalysts; III. Production of Polyolefins with Controlled Microstructures," J. Polym. Sci. Part A: Polym Chem., v.38(9), pp. 1427-1432.

Kociolek, M. G. et al. (1999) "Intramolecular Thermal Cyclotrimerization of an Acyclic Triyne: An Uncatalyed Process," Tetrahedron Letters, v. 40(22), pp. 4141-4144.

Resconi, L. et al. (2005) "Metallocene Catalysts for Propylene Polymerization" Polypropylene Handbook (N. Pasquini, Ed.), Ch. 2.2, Hanser Publishers, Munich, pp. 116-121.

Schmidt, R. et al. (2001) "Synthesis and Characterization of Unbridged Metallocene Dichloride Complexes with Two Differently Mono-Substituted Indenyl Ligands and their Application as Catalysts for the Polymerization of Ethene and Propene," Journal of Molecular Catalysis A: Chemical, v.172(1-2), pp. 43-65.

Tynys, A. et al. (2005) "Ethylene-Propylene Copolymerizations: Effect of Metallocene Structure on Termination Reactions and Polymer Microstructure," Macromol. Chem. Phys., v.206(10), pp. 1043-1056.

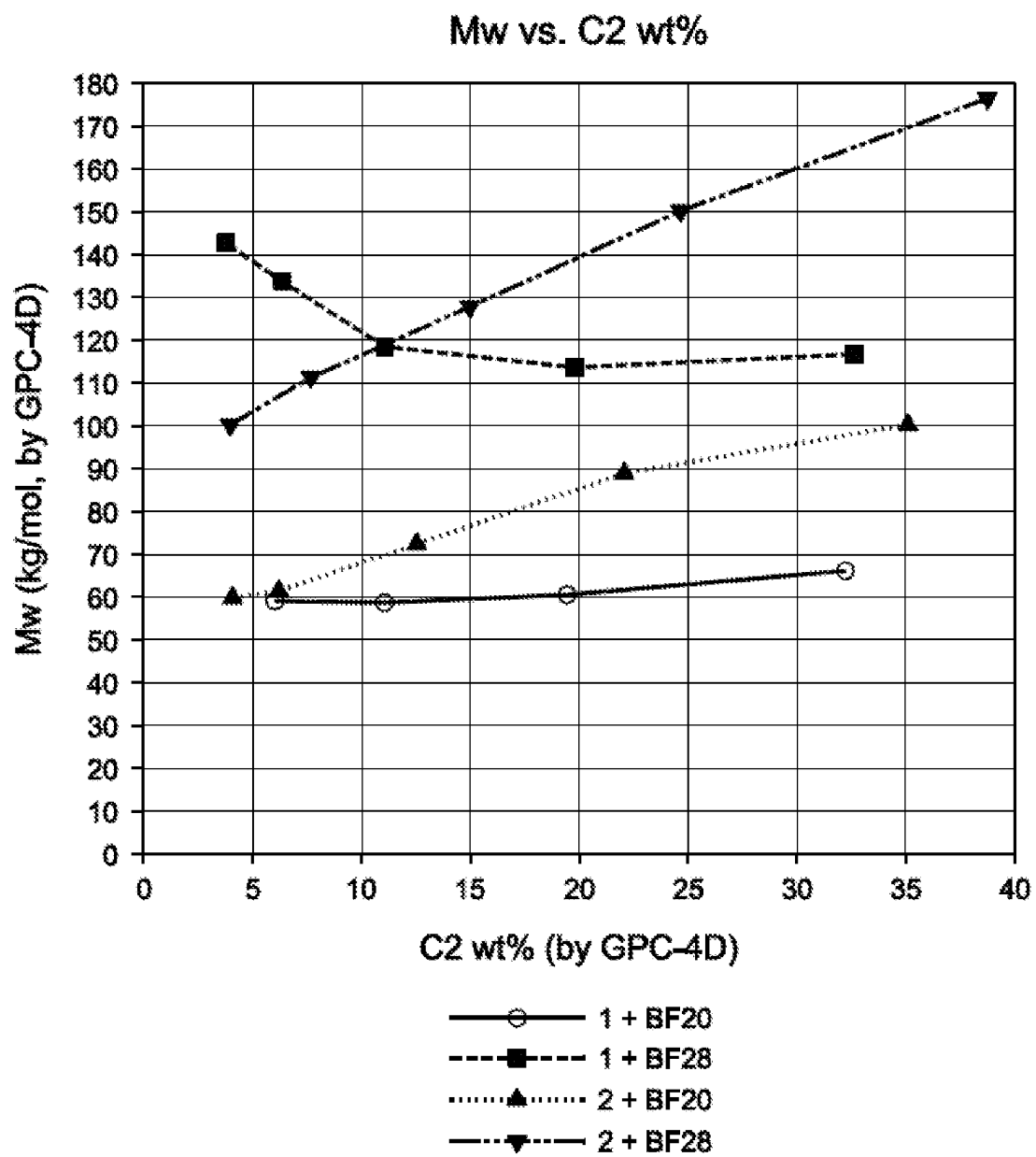

INDACENE BASED METALLOCENE CATALYSTS USEFUL IN THE PRODUCTION OF PROPYLENE POLYMERS

CROSS REFERENCE TO RELATED APPLICATIONS

This application claims priority to and the benefit of U.S. Ser. No. 62/914,209, filed Oct. 11, 2019, which is incorporated by reference herein.

This application is related to PCT Application PCT/US2020/055023, filed concurrently herewith, and entitled "Catalysts for Olefin Metathesis, Methods of Preparation, and Processes for the Use Thereof," which claims priority to U.S. Ser. No. 62/914,197, filed Oct. 11, 2019, which are incorporated by reference herein.

This application is related to PCT Application PCT/US2020/055032, filed concurrently herewith and entitled "Catalysts for Olefin Metathesis, Methods of Preparation, and Processes for the Use Thereof," which claims priority to U.S. Ser. No. 62/914,222, filed Oct. 11, 2019, which are incorporated by reference herein.

This application is related to application U.S. Ser. No. 17/067,256, filed concurrently herewith entitled "Catalysts for Olefin Polymerization," which claims priority to U.S. Ser. No. 62/914,262, filed Oct. 11, 2019, which are incorporated by reference herein.

FIELD OF THE INVENTION

This invention relates to novel catalyst compounds, catalyst systems and methods of controlling polymer properties using bridged metallocene catalysts comprising a 1,5,6,7-tetrahydro-s-indacenyl moiety bridged to another indacenyl moiety or bridged to a substituted or unsubstituted indenyl moiety.

BACKGROUND OF THE INVENTION

Olefin polymerization catalysts are of great use in industry. Hence, there is interest in finding new catalyst systems that increase the commercial usefulness of the catalyst and allow the production of polymers having improved properties. In particular, relatively high catalyst activity at higher reaction temperatures to produce ethylene-propylene copolymers having relatively high molecular weight.

Catalysts for olefin polymerization are often based on metallocenes as catalyst precursors, which are typically activated either with an alumoxane or with an activator containing a non-coordinating anion. Metallocene catalysts for propylene copolymers, however, have been limited by their inability to produce propylene-ethylene copolymers of high molecular weight or other desired properties under commercially desired operating conditions. This has been observed for many metallocene structures, such as the syndiospecific $C_s$ symmetric $Me_2C(Cp)(Flu)ZrCl_2$, the aspecific $C_{2v}$ symmetric $Me_2Si(Flu)_2ZrCl_2$, and both the $C_2$ symmetric rac-$Me_2C(3\text{-}iPr\text{-}Ind)_2ZrCl_2$ and the fluxional (2-Ph-Ind)$_2$ZrCl$_2$ catalysts for elastomeric polypropylene. This deficit has also been found for the isospecific $C_2$ symmetric rac-$Me_2Si(2\text{-}Me\text{-}4,5\text{-}Benz\text{-}Ind)_2ZrCl_2$ and rac-$Me_2Si(2\text{-}Me\text{-}4\text{-}Ph\text{-}Ind)_2ZrCl_2$ (Resconi, L. et al. (2005) "Metallocene Catalysts for Propylene Polymerization" *Polypropylene Handbook* (N. Pasquini, Ed.), Ch. 2.2, Hanser Publishers, Munic). It is thought that, while the 2-Me substitution of this catalyst family suppresses the β-hydrogen transfer to the propylene monomer and thus prevents the formation of low molecular weight polymer, it fails to prevent the β-hydrogen transfer to the ethylene comonomer in case of the latter's presence. This β-hydrogen transfer to the ethylene comonomer becomes the favored chain termination mechanism and leads to the formation of low molecular weight propylene-ethylene copolymers (Tynys, A. et al. (2005) "Ethylene-Propylene Copolymerizations: Effect of Metallocene Structure on Termination Reactions and Polymer Microstructure," *Macromol. Chem. Phys.*, v. 206(10), pp. 1043-1056). Exceptions have been found in some zirconocenes with bulky ligands, such as rac-$Me_2C(3\text{-}tBu\text{-}Ind)_2ZrCl_2$, which show a marked increase in molecular weight by ethylene incorporation. This catalyst, however, has shortcomings in terms of homopolymer molecular weight and activity.

Desirable metallocene catalysts for isotactic polypropylene production produce polypropylenes with high melting points. This thought to be due to high stereospecificity and/or regioselectivity in the polymer microstructure. Within the rac-$Ak_2Si(2\text{-}Alk\text{-}Ind)_2ZrCl_2$ catalyst family (Alk=Alkyl), the stereospecificity and regioselectivity is continuously being modified. For Example, EP 834519A1 relates to rac-$Me_2Si(2\text{-}Me\text{-}4\text{-}Ar\text{-}Ind)_2ZrCl_2$ type metallocenes for the production of rigid, high melting point polypropylenes with high stereoregularity and very low amounts of regio errors. However, these polypropylenes did not fare well under commercially relevant process conditions and suffered from low activity/productivity-levels.

US 2001/0053833 discloses metallocenes where the 2-position is substituted with an unsubstituted heteroaromatic ring or a heteroaromatic ring having at least one substituent bonded to the ring that produce propylene ethylene copolymers having less than desired melting points.

WO 2001/058970 relates to impact copolymers having a high melting point and a good rubber content, produced by catalysts of the rac-$Me_2Si(2\text{-}Ak\text{-}4\text{-}Ar\text{-}Ind)_2ZrCl_2$ family when both alkyl substituents were iso-propyl groups. However, these catalysts suffer from activity issues.

WO 2002/002576 discloses bridged metallocenes of the (2-Alkyl-4-Ph-Ind)$_2$ZrCl$_2$ family where the 2-positions can be isopropyl and the Ph substituents are substituted in the 3 and 5-positions, particularly with t-butyl. However, these catalysts also suffer from activity/productivity issues at commercial conditions.

WO 2003/002583 discloses bridged metallocenes of the (2-Alkyl-4-Ph-Ind)$_2$ZrCl$_2$ family where the 2-positions may be substituted with isopropyl groups and the 4-positions are substituted with Ph group substituted at the 2-position, particularly with a phenyl group. However, these catalysts also suffer from activity/productivity issues at commercial conditions. In addition, these catalysts have relatively low Mw capabilities for isotactic homopolypropylene.

EP 1250365; WO 1997/040075; and WO 2003/045551 relate to bis-indenyl metallocenes where substituents at the 2-positions of either of the indenyl ligands are branched or cyclized in the α-position. However, these catalysts still have relatively limited Mw capabilities for isotactic homopolypropylene.

WO 2004/106351 relates to bisindenyl metallocenes having substituents in the 2-positions of the indenyl ligands with the proviso that one ligand is unbranched or bound via a $sp^2$-hybridized carbon atom and the other ligand is branched in the α-position. However, these catalysts still have relatively limited Mw capabilities for isotactic homopolypropylene.

U.S. Pat. No. 8,507,706 discloses bisindenyl metallocenes where at least one 2-position on the indenyl groups is substituted with a group branched at the beta-position and the other 2-position is not branched at the alpha-position. US 2011/0230630 discloses similar metallocenes except that the group at the 2-position is branched in the beta-position and that the beta-carbon atom is a quaternary carbon atom and part of a non-cyclic hydrocarbon system.

U.S. Pat. No. 7,829,495 discloses alkyl substituted metallocenes having a " . . . $C_3$ or greater hydrocarbyl . . . substitutent bonded to either the $L^A$ or $L^B$ ring through a primary carbon atom . . . preferably an n-alkyl substituent . . . " (see column 4, lines 9-12). Further, in the Examples section, (n-propylcyclopentadienyl)(tetramethylcyclopentadienyl)zirconium dichloride combined with methylalumoxane and Davision™ 948 silica is used for ethylene hexene polymerization; bis(n-propyl cyclopentadienyl) zirconium dichloride combined with methylalumoxane and Davision™ 948 silica is used for ethylene hexene polymerization; and dimethylsilyl(flourenyl)(n-propyl cyclopentadienyl) zirconium dichloride combined with methylalumoxane and Davision silica is used for ethylene hexene polymerization.

US 2015/0025208, published Jan. 22, 2015, discloses bridged bisindenyl compounds where the 2-positions on the indene ($R^2$ and $R^8$) are not the same and the 4-positions on the indene ($R^4$ and $R^{10}$) are substituted phenyl groups, where at least one of $R^4$ and $R^{10}$ is a phenyl group substituted at the 3 and 5-position.

US 2005/0182266 discloses a process for preparing transition metal compounds having a specific substitution pattern, the corresponding transition metal compounds themselves and their use in the preparation of catalyst systems and also the use of the catalyst systems in the polymerization and copolymerization of olefins.

WO 2017/204830 and the related US 2017/0342175, both of which published Nov. 30, 2017, are generally directed to homogeneous (solution) polymerization of propylene at higher temperatures (80° C. or more) using bisindenyl metallocene catalyst compounds having long (at least 4 carbon atoms) linear alkyl groups substituted at the 2-position and substituted or unsubstituted aryl groups at the 4-position.

WO 2004/013149 A1 discloses group 4 metal constrained geometry complexes of tricyclic 4-aryl substituted indenyl ligands, esp. 1,5,6,7-tetrahydro-4-aryl-s-indacen-1-yl ligands, where the tetrahydro-s-indacene is substituted in the 4 position with a $C_{6-12}$ aryl group, and is preferably not substituted in the 5, 6, or 7 position, and if substituted in the 5, 6, or 7 position, is substituted by at most only one substituent at each position.

U.S. Pat. No. 6,420,507 discloses substituted tetrahydro-s-indacenyl transition metal complexes (such as Examples H to N), where the tetrahydro-s-indacene is not substituted the 5, 6, or 7 position and is substituted in the 2 and/or 3 position.

EP 1 120 424 (and family member U.S. Pat. No. 6,613,713) disclose tert-butylamino-2-(5,6,7-tetrahydro-s-indacenyldimethylsilyl) titanium dichloride indenyl ligands as polymerization catalyst where the tetrahydro-s-indacene is not substituted the 5, 6, or 7 position.

U.S. Ser. No. 15/145,320, filed May 3, 2016 discloses tetrahydro-as-indacenyl catalyst compositions, catalyst systems using such, and processes for use thereof.

US 2019/0119418 discloses tetrahydro-s-indacenyl catalyst compositions, catalyst systems using such, and processes for use thereof.

Other references of interest include: U.S. Pat. Nos. 6,051,727; 6,255,506; EP 0 576 970; U.S. Pat. Nos. 5,459,117; 5,532,396; 5,543,373; 5,585,509; 5,631,202; 5,696,045; 5,700,886; 6,492,465; 6,150,481; 5,770,753; 5,786,432; 5,840,644; 6,242,544; 5,869,584; 6,399,533; 6,444,833; 6,559,252; 6,608,224; 6,635,779; 6,841,501; 6,878,786; 6,949,614; 6,953,829; 7,034,173; 7,141,527; 7,314,903; 7,342,078; 7,405,261; 7,452,949; 7,569,651; 7,615,597; 7,799,880; 7,964,679; 7,985,799; 8,222,356; 5,278,264; 5,276,208; 5,049,535; WO 2002/002575; WO 2002/022575; WO 2003/002583; U.S. Pat. No. 7,122,498; US 2010/0267907; EP 1 250 365; WO 1997/9740075; WO 2003/045551; WO 2002/002576; US 2015/0025205; U.S. Ser. No. 14/572,195; filed Dec. 16, 2014; U.S. Pat. No. 9,193,856; WO 2004/052945; US 2016/0032025; WO 1998/027103; WO 2001/042315 and Schmidt, R. et al. (2001) "Synthesis and Characterization of Unbridged Metallocene Dichloride Complexes with Two Differently Mono-Substituted Indenyl Ligands and their Application as Catalysts for the Polymerization of Ethene and Propene," *Journal of Molecular Catalysis A: Chemical*, v. 172(1-2), pp. 43-65; Amaya, T. et al. (2014) "Sumanenyl Metallocenes: Synthesis and Structure of Mono- and Trinuclear Zirconocene Complexes" *Journal of the American Chemical Society*, v. 136(36), pp. 12794-12798; Kociolek, M. G. et al. (1999) "Intramolecular Thermal Cyclotrimerization of an Acyclic Triyne: An Uncatalyzed Process," *Tetrahedron Letters*, v. 40(22), pp. 4141-4144.

U.S. Pat. Nos. 9,803,037; 9,796,795; 9,266,910; US 2018/0094088; 2017/0342175; US 2019/0161560; US 2019/0263953; U.S. Pat. No. 9,458,254; US 2006/0009595; US 2006/0025545; US 2006/02933474; US2017/0015767; US 2019/0284311.

Other references of interest include: U.S. Pat. Nos. 5,382,630; 5,382,631; 8,575,284; 6,069,213; Kim, J. D. et al. (2000) "Copolymerization of Ethylene and α-Olefins with Combined Metallocene Catalysts; III. Production of Polyolefins with Controlled Microstructures," *J. Polym. Sci. Part A: Polym Chem.*, v. 38(9), pp. 1427-1432; Iedema, P. D. et al. (2004) "Predicting the Molecular Weight Distribution of Polyethylene for Mixed Systems with a Constrained-Geometry Metallocene Catalyst in a Semibatch Reactor," *Ind. Eng. Chem. Res.*, v. 43(1), pp. 36-50; U.S. Pat. Nos. 6,656,866; 8,815,357; US 2014/0031504; U.S. Pat. Nos. 5,135,526; 7,385,015; WO 2007/080365; WO2012/006272; WO2014/0242314; WO 2000/12565; WO 2002/060957; WO 2004/046214; U.S. Pat. Nos. 6,846,770; 6,664,348; WO 2005/075525; US 2002/007023; WO 2003/025027; US 2005/0288461; U.S. Pat. Nos. 8,088,867; 5,516,848; 4,701,432; 5,077,255; 7,141,632; 6,207,606; 8,598,061; Hong, S. C. et al. (2007) "Immobilized Me$_2$Si(C$_5$Me$_4$)(N-tBu)TiCl$_2$/(nBuCp)$_2$ZrCl$_2$ Hybrid Metallocene Catalyst System for the Production of Poly(ethylene-co-hexene) with Pseudo-Bimodal Molecular Weight and Inverse Comonomer Distribution," *Polymer Engineering and Science*, v. 47(2), pp. 131-139; US 2012/0130032; U.S. Pat. Nos. 7,192,902; 8,110,518; 7,355,058; US 2018/0171040; and US 2017/0362350.

It is advantageous to conduct commercial solution polymerization reactions at elevated temperatures. Two major catalyst limitations often preventing access to such high temperature polymerizations are the catalyst efficiency and the molecular weight of produced polymers, as both of these factors decrease with rising temperature. The metallocene catalysts suitable for use in producing propylene elastomers have relatively limited molecular weight (MW) capabilities which may require low process temperatures to achieve a desired low MFR product. A catalyst system capable of producing similar propylene elastomers with relatively higher MW capabilities would provide polymers having an extended MFR range and may potentially reduce operating costs and increase reactor throughput by utilizing a higher polymerization temperature during polymer production.

There is still a need in the art for new and improved catalyst systems for the polymerization of olefins, in order to achieve these and other polymer properties, such as improved MFR in propylene elastomers, capable of polymerization at higher temperatures without deteriorating the resulting polymer's properties.

It is therefore an object of the present invention to provide novel catalyst compounds, catalysts systems comprising such compounds, and processes for the polymerization of olefins using such compounds and systems.

Furthermore, it is an objective of the present invention to provide olefin polymers having improved properties, particularly propylene ethylene elastomers having higher MFR as well as other improved properties.

SUMMARY OF THE INVENTION

This invention relates to a transition metal compound, preferably useful for polymerizing propylene and optional olefin comonomer, represented by formula (I) or (II):

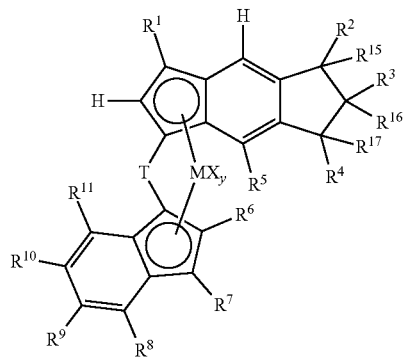

(I)

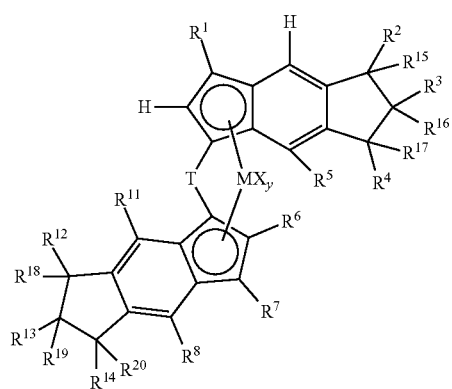

(II)

wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$, is independently, hydrogen, halogen, or a monovalent hydrocarbyl radical comprising from one to twenty carbon atoms, silicon atoms, germanium atoms, or a combination thereof, optionally two or more of $R^1$, $R^2$, $R^3$, $R^4$, $R^5$, $R^{15}$, $R^{16}$, and $R^{17}$, or two or more of $R^6$, $R^7$, $R^8$, $R^9$, $R^{10}$, $R^{11}$ in formula (I), or two or more of $R^6$, $R^7$, $R^8$, $R^{11}$, $R^{12}$, $R^{13}$, $R^{14}$, $R^{18}$, $R^{19}$, $R^{20}$ in formula (II), form a saturated or unsaturated ring comprising three or more carbon atoms, silicon atoms, germanium atoms, or a combination thereof;

M is a group 2, 3 or 4 transition metal;

T is a divalent bridging group represented by the formula (BR):

(BR)

wherein E is C, Si, or Ge when n=1; or E is Si and/or Ge when n is 2 or more; each R' and R" is, independently, hydrogen, halogen, a monovalent substituted or unsubstituted hydrocarbyl radical comprising from one to twenty carbon atoms, or R' and R" form a substituted or unsubstituted cyclic structure including an aromatic ring system, a partially saturated ring system, or a saturated ring system comprising three or more carbon atoms;

y is 1 or 2; and each X is a leaving group independently comprising a halogen, a monovalent hydrocarbyl radical comprising from one to twenty carbon atoms, unsubstituted or substituted with one or more functional groups, wherein the functional group is an amine, imide, amide, ether, alcohol, hydroxide, sulfide, sulfate, phosphide, halide, phosphonate, alkoxide, ester, carboxylate, aldehyde or combination thereof, or two X groups join together to form a $C_4$ to $C_{62}$ cyclic or polycyclic ring structure when y=2.

The invention further relates to a catalyst system useful for polymerizing propylene and optional olefin comonomer comprising: a transition metal compound according to one or more embodiments disclosed herein, and an activator, such as a non-coordinating anion activator which preferably comprises a cationic moiety represented by formula (CT) and an anionic moiety represented by formula (A):

$(NHR^aR^bR^c)^+$ (CT)

$(B(F-AR)_4)^-$; (A)

wherein each of $R^a$, $R^b$, and $R^c$ is, independently, a $C_1$-$C_{10}$ hydrocarbyl, substituted hydrocarbyl, halocarbyl, or substituted halocarbyl; and where (F-AR) is an at least partially fluorinated aromatic hydrocarbon having from 6 to 14 carbon atoms, and B is boron (alternately B may be replaced with a group 13 atom).

The invention also relates to a process to polymerize propylene comprising the steps of contacting, propylene and additional comonomer (preferably alpha-olefin) with catalyst system according to one or more embodiments disclosed herein and obtaining propylene-homo- or co-polymer.

The invention also relates to a process to polymerize propylene comprising the steps of contacting, propylene and at least one additional comonomer with catalyst system according to one or more embodiments disclosed herein at a temperature of 60° C. or more, and obtaining propylene copolymer comprising from 0.5 to 60 weight % of the olefin comonomer, based upon the weight of the polymer.

BRIEF DESCRIPTION OF THE FIGURE

FIG. 1 (FIG. 1) shows a plot of weight average molecular weight (g/mol) versus ethylene content (wt %) for ethylene-propylene copolymer produced at 85° C. using catalyst systems according to embodiments disclosed herein.

DETAILED DESCRIPTION OF THE INVENTION

For the purposes of this invention and the claims thereto, the new numbering scheme for the Periodic Table Groups is used as described in *Chemical And Engineering News*, v. 63(5), p. 27 (1985). Therefore, a "Group 4 metal" is an element from Group 4 of the Periodic Table.

A homogeneous catalyst system is a system where the transition metal catalyst compound and the activator are dissolved in the polymerization medium, typically the catalyst system is not supported on a support and is dissolved in the solvent/monomer mixture.

Unless otherwise indicated, "catalyst activity" is reported as the mass of product polymer produced per mole of catalyst used over a period of time in a batch process. This may be given in units of (kg of polymer)/(mmol of catalyst) (minute). Catalyst activity is reported as the mass of polymer product produced in the polymerization system per mass of catalyst used for the polymer production in a continuous process. This may be given in kg of polymer/kg of catalyst. Other units of mass, molar quantity, or time may similarly be employed. Unless otherwise indicated, "conversion" is the amount of monomer that is converted to polymer product, and is reported as mol % and is calculated based on the polymer yield and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer in relation to the weight of the total polymer present. A "polymer" has two or more of the same or different mer units.

A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on. For the purposes of this invention, ethylene shall be considered an α-olefin.

The term "alpha-olefin" refers to an olefin having a terminal carbon-to-carbon double bond in the structure thereof (($R^1R^2$)—C=$CH_2$, where $R^1$ and $R^2$ can be independently hydrogen or any hydrocarbyl group; preferably $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

Unless otherwise indicated, (e.g., the definition of "substituted hydrocarbyl," etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

Unless otherwise indicated, room temperature is 23° C.

"Different" or "not the same" as used to refer to R groups in any formula herein or any substituent herein indicates that the groups or substituents differ from each other by at least one atom or are different isomerically.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in units of g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

A "catalyst system" is the combination of at least one catalyst compound, at least one activator, and an optional co-activator. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably. An "anionic ligand" is a negatively charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties bonded to a transition metal. Substituted or unsubstituted cyclopentadienyl ligands include substituted or unsubstituted indenyl, fluorenyl, tetrahydro-s-indacenyl, tetrahydro-as-indacenyl, benz[f]indenyl, benz[e]indenyl, tetrahydrocyclopenta[b]naphthalene, tetrahydrocyclopenta[a]naphthalene, and the like.

For purposes of this invention and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

The terms "alkoxy" or "alkoxide" and aryloxy or aryloxide mean an alkyl or aryl group bound to an oxygen atom, such as an alkyl ether or aryl ether group/radical connected to an oxygen atom and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and aryloxy radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

"Asymmetric" as used in connection with the instant bis-indacenyl compounds (such as those represented by formula (II)) means that the substitutions at the 4-positions are different, or the substitutions at the 2-positions are different, or the substitutions at the 4-positions are different and the substitutions at the 2-positions are different (where numbering begins with the bridge as the 1 position). "Asymmetric" as used in connection with (Indacenyl(Indenyl) compounds (such as those represented by formula (I)) means that $R^{10}$ and $R^9$ do not form a five membered saturated ring (i.e. an s-indacene).

Metallocene Catalyst Compounds

Metallocene catalyst compound useful herein as the transition metal compound include those represented by formula (I) or (II):

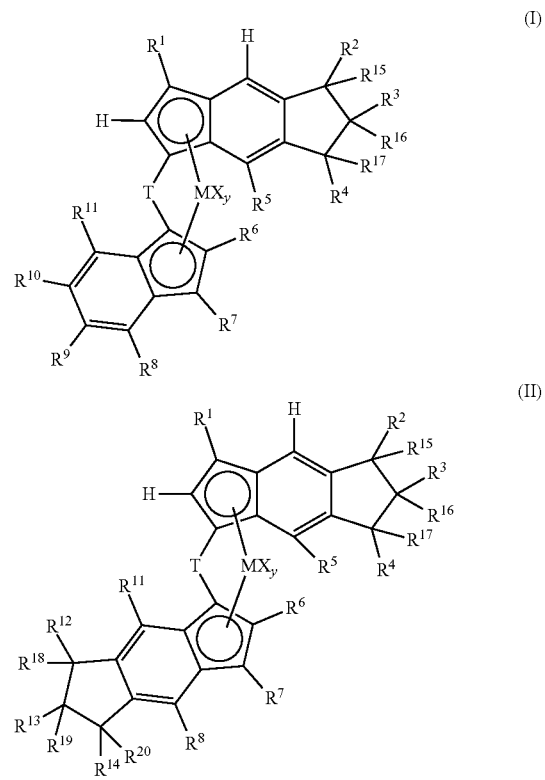

wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$, is independently, hydrogen, halogen, or a monovalent hydrocarbyl radical comprising from one to twenty carbon atoms, silicon atoms, germanium atoms, or a combination thereof, optionally two or more of $R^1$, $R^2$, $R^3$, $R^4$, $R^5$, $R^{15}$, $R^{16}$, and $R^{17}$, two or more of $R^6$, $R^7$, $R^8$, $R^9$, $R^{10}$, $R^{11}$ in formula (I), or two or more of $R^6$, $R^7$, $R^8$, $R^{11}$, $R^{12}$, $R^{13}$, $R^{14}$, $R^{18}$, $R^{19}$, $R^{20}$ in formula (II), form a saturated or unsaturated ring comprising three or more carbon atoms, silicon atoms, germanium atoms, or a combination thereof;

M is a group 2, 3 or 4 transition metal, preferably Hf, Ti or Zr;

T is a divalent bridging group represented by the formula (BR):

wherein:

E is C, Si, or Ge when n is 1, E is Si and/or Ge when n is 2 or more;

each R' and R' is, independently, hydrogen, halogen, a monovalent substituted or unsubstituted hydrocarbyl radical comprising from one to twenty carbon atoms, or R' and R" form a substituted or unsubstituted cyclic structure including an aromatic ring system, a partially saturated ring system, or a saturated ring system comprising three or more carbon atoms;

y is 1 or 2; and each X is a leaving group independently comprising a halogen, a monovalent hydrocarbyl radical comprising from one to twenty carbon atoms, unsubstituted or substituted with one or more functional groups, wherein the functional group is an amine, imide, amide, ether, alcohol, hydroxide, sulfide, sulfate, phosphide, halide, phosphonate, alkoxide, ester, carboxylate, aldehyde or combination thereof, or two X groups join together to form a $C_4$ to $C_{62}$ cyclic or polycyclic ring structure when y is 2.

In one or more embodiments, the metallocene, also referred to as the transition metal compound, is represented by formula (I), and nine or more of $R^1$, $R^2$, $R^3$, $R^4$, $R^5$, $R^6$, $R^7$, $R^8$, $R^9$, and $R^{10}$ are hydrogen. In alternative embodiments, the transition metal compound is represented by formula (II) and eleven or more of $R^1$, $R^2$, $R^3$, $R^4$, $R^5$, $R^6$, $R^7$, $R^8$, $R^{11}$, $R^{12}$, $R^{13}$, and $R^{14}$ are hydrogen.

In one or more embodiments, the metallocene, also referred to as the transition metal compound, is represented by formula (I), and nine or more of $R^1$, $R^2$, $R^3$, $R^4$, $R^5$, $R^6$, $R^7$, $R^8$, $R^9$, $R^{10}$, $R^{15}$, $R^{16}$, $R^{17}$, are hydrogen. In alternative embodiments, the transition metal compound is represented by formula (II) and eleven or more of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ are hydrogen.

In one or more embodiments, the metallocene, also referred to as the transition metal compound, is represented by formula (I), and nine or more of $R^1$, $R^2$, $R^3$, $R^4$, $R^5$, $R^6$, $R^7$, $R^8$, $R^9$, $R^{10}$, $R^{15}$, $R^{16}$, $R^{17}$, are hydrogen. In alternative embodiments, the transition metal compound is represented by formula (II) and eleven or more of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ are hydrogen.

Typically, in compounds represented by formula (I), $R^9$ and $R^{10}$ do not form a $C_5$ saturated ring, i.e. do not form an s-indacene.

In one or more embodiments, E is Si and each of R' and R" is independently, a monovalent alkyl radical having from 1 to 4 carbon atoms, a benzyl radical, or a monovalent aromatic radical having from 6 to 10 carbon atoms; and n is 1. In preferred embodiments, each of R' and R" is independently, a monovalent alkyl radical having from 1 to 4 carbon atoms, preferably methyl.

In one or more embodiments, the transition metal compound is represented by formula (I), and each of $R^1$, $R^2$, $R^3$, $R^4$, $R^5$, $R^6$, $R^7$, $R^8$, $R^9$, and $R^{10}$ is hydrogen, M is a group 4 transition metal; E is Si; each of R' and R" is, independently, a monovalent $C_1$ to $C_4$ alkyl radical; n is 1; and y is 2.

In one or more embodiments, the transition metal compound is represented by formula (I), and each of $R^1$, $R^2$, $R^3$, $R^4$, $R^5$, $R^6$, $R^7$, $R^{10}$ and $R^{11}$ is hydrogen; and $R^8$, and $R^9$ are bridged together forming a 6 membered aromatic ring; M is a group 4 transition metal; E is Si; each of R' and R" is, independently, a monovalent $C_1$ to $C_4$ alkyl radical; n is 1; and y is 2.

In one or more embodiments, the transition metal compound is represented by formula (II), and each of $R^1$, $R^2$, $R^3$, $R^4$, $R^5$, $R^6$, $R^7$, $R^8$, $R^{11}$, $R^{12}$, $R^{13}$, and $R^{14}$ is hydrogen; M is a group 4 transition metal; E is Si; each of R' and R" is, independently, a monovalent $C_1$ to $C_4$ alkyl radical; n is 1; and y is 2. In one or more embodiments, the transition metal compound is represented by formula (II), wherein each of $R^1$, $R^2$, $R^3$, $R^4$, $R^6$, $R^7$, $R^8$, $R^1$, $R^{12}$, $R^{13}$, and $R^{14}$ is hydrogen; $R^5$ is a phenyl moiety; M is a group 4 transition metal; E is Si; each of R' and R" is, independently, a monovalent $C_1$ to $C_4$ alkyl radical; n is 1; and y is 2.

In one or more embodiments, M is Hf, Ti and/or Zr, particularly Hf and/or Zr, particularly Hf.

Suitable radicals for the each of the groups $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ are independently selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis (triflouromethyl)phenyl; and from all isomers of benzyl, and all isomers of hydrocarbyl substituted benzyl including methylbenzyl, dimethylbenzyl.

In other embodiments of the invention, each X is capable of forming an anionic leaving group upon activation of the catalyst. In embodiments each X is independently, selected from the group consisting of hydrocarbyl radicals having from 1 to 20 carbon atoms, hydrides, amides, alkoxides, sulfides, phosphides, halides, dienes, amines, phosphines, ethers, and a combination thereof (two X's may form a part of a fused ring or a ring system).

Suitable examples for X include chloride, bromide, fluoride, iodide, hydride, and $C_1$ to $C_{20}$ hydrocarbyls, preferably methyl, ethyl, propyl, butyl, pentyl, hexyl, phenyl, benzyl, and all isomers thereof, or two X together are selected from $C_4$ to $C_{10}$ dienes, preferably butadiene, methylbutadiene, pentadiene, methylpentadiene, dimethylpentadiene, hexadiene, methylhexadiene, dimethylhexadiene, or from $C_1$ to $C_{10}$ alkylidenes, preferably methylidene, ethylidene, propylidene, or from $C_3$ to $C_{10}$ alkyldiyls, preferably propandiyl, butandiyl, pentandiyl, and hexandiyl. In particular, X is chloride or methyl.

In one or more embodiments, each X is a leaving group independently comprising a halogen, a monovalent hydrocarbyl radical comprising from one to twenty carbon atoms, unsubstituted or substituted with one or more functional groups, wherein the functional group is an amine, imide, amide, ether, alcohol, hydroxide, sulfide, sulfate, phosphide, halide, phosphonate, alkoxide, ester, carboxylate, aldehyde or combination thereof, or two X groups join together to form a $C_4$ to $C_{62}$ cyclic or polycyclic ring structure when y=2.

In any embodiment, T is a bridging group selected from $R'_2C$, $R'_2Si$, $R'_2Ge$, $R'_2CCR'_2$, $R'_2CCR'_2CR'_2$, $R'C=CR'$, $R'C=CR'CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, R'C=CR'GeR'$_2$, R'B, R'$_2$C—BR', R'$_2$C—BR'—CR'$_2$, R'N, R'$_2$C—NR', R'$_2$C—NR'—CR'$_2$, R'P, R'$_2$C—PR', and R'$_2$C—PR'—CR'$_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for the bridging group T include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

In particular, T is CH$_2$, CH$_2$CH$_2$, C(CH$_3$)$_2$, SiMe$_2$, SiPH$_2$, SiMePh, Si(CH$_2$)$_3$, Si(CH$_2$)$_4$, Si(Me$_3$SiPh)$_2$, or Si(CH$_2$)$_5$.

In another embodiment, T is represented by the formula R$_2^a$J, where J is C, Si, or Ge, and each R$^a$ is, independently, hydrogen, halogen, C$_1$ to C$_{20}$ hydrocarbyl or a C$_1$ to C$_{20}$ substituted hydrocarbyl, and two R$^a$ can form a cyclic structure including aromatic, partially saturated, or saturated cyclic or fused ring system.

In a preferred embodiment of the invention in any formula described herein, T is represented by the formula, (R*$_2$G)$_g$, where each G is C, Si, or Ge, g is 1 or 2, and each R* is, independently, hydrogen, halogen, C$_1$ to C$_{20}$ hydrocarbyl or a C$_1$ to C$_{20}$ substituted hydrocarbyl, and two or more R* can form a cyclic structure including aromatic, partially saturated, or saturated cyclic or fused ring system.

In one or more embodiments, T is a divalent bridging group represented by formula (BR):

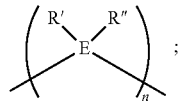

(BR)

wherein E is C, Si, or Ge when n=1, and E is Si and/or Ge when n is 2 or more; each R; and R" is, independently, hydrogen, halogen, a monovalent substituted or unsubstituted hydrocarbyl radical comprising from one to twenty carbon atoms, or R' and R" form a substituted or unsubstituted cyclic structure including an aromatic ring system, a partially saturated ring system, or a saturated ring system comprising three or more carbon atoms.

In aspects of the invention, the rac/meso ratio of the metallocene catalyst is 200:1 or greater, 100:1 or greater, 70:1 or greater, 50:1 or greater, or 40:1 or greater, or 30:1 or greater, or 20:1 or greater, or 15:1 or greater, or 10:1 or greater, or 7:1 or greater, or 5:1 or greater.

In an embodiment of the invention, the metallocene catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the invention, the metallocene, especially the bridged bis(indacenyl)metallocene, compound consists essentially of the racemic isomer.

Amounts of rac and meso isomers are determined by proton NMR. $^1$H NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated methylene chloride in the deuterated methylene chloride, which is expected to show a peak at 5.32 ppm.

In a preferred embodiment in any of the processes described herein one catalyst compound is used. For purposes of this invention one metallocene catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include ionizing activators, which may be neutral or ionic, e.g. a non-coordinating anion. Preferred activators typically include ionizing anion precursor compounds that abstract a reactive, σ-bound, metal ligand making the metal complex cationic and providing a charge-balancing noncoordinating or weakly coordinating anion.

In embodiments, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. For purposes herein, the terms "non-coordinating anion activator", "non-coordinating activator", "NCA" and "NCA activator" are used interchangeably, unless indicated otherwise.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient liability to permit displacement during polymerization.

Preferably, the non-coordinating anion activators comprise a cationic moiety represented by formula (CT) and an anionic moiety represented by formula (A):

wherein each of $R^a$, $R^b$, and $R^c$ is, independently, a $C_1$-$C_{10}$ hydrocarbyl, substituted hydrocarbyl, halocarbyl, or substituted halocarbyl; B is boron, and where (F-AR) is an at least partially fluorinated aromatic hydrocarbon having from 6 to 14 carbon atoms. In alternate embodiments B is replaced with a group 13 atom, such as Al.

In embodiments, anionic moiety is represented by formula (AI):

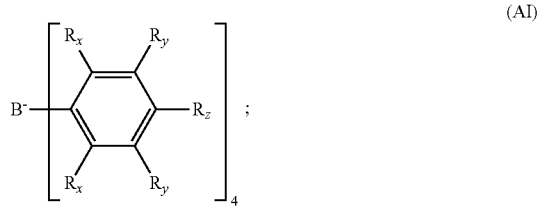

where:
B is boron;
each $R_x$ is, independently, a halide, preferably a fluoride;
each $R_y$ is, independently, a halide, a $C_6$ to $C_{20}$ substituted aromatic hydrocarbyl group or a siloxy group of the formula —O—Si—$R^\#$, where each $R^\#$ is independently a $C_1$ to $C_{20}$ hydrocarbyl or hydrocarbylsilyl group, preferably $R_y$ is a fluoride or a perfluorinated phenyl group;
each $R_z$ is a halide, $C_6$ to $C_{20}$ substituted aromatic hydrocarbyl group or a siloxy group of the formula —O—Si—$R^\#$, where each $R^\#$ is independently a $C_1$ to $C_{20}$ hydrocarbyl or hydrocarbylsilyl group, preferably $R_z$ is a fluoride or a $C_6$ perfluorinated aromatic hydrocarbyl group; wherein $R_y$ and $R_z$ can form one or more saturated or unsaturated, substituted or unsubstituted rings, preferably $R_y$ and $R_z$ form a perfluorinated phenyl ring. Such activators are also known as bulky activators. Preferably, the anion moiety of the activator has a molecular weight of greater than 1020 g/mol; and at least three of the substituents on the B atom each have a molecular volume of greater than 250 cubic Å, alternately greater than 300 cubic Å, or alternately greater than 500 cubic Å.

For purposes herein, the "molecular volume" is an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table at column 20, line 35 et seq. of U.S. Pat. No. 9,266,977, which is fully incorporated by reference herein. For a list of bulky activators attention is directed to U.S. Pat. No. 8,658,556, which is incorporated by reference herein.

In one or more embodiments, one or more of the NCA activators is chosen from the activators described in U.S. Pat. No. 6,211,105.

Preferred activators for use herein include N,N-dimethylanilinium tetrakis(perfluoronaphthalen-2-yl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [Me$_3$NH$^+$][B(C$_6$F$_5$)$_4$$^-$]; 1-(4-(tris (pentafluorophenyl)borate)-2,3,5,6-tetrafluorophenyl) pyrrolidinium; and 4-(tris(pentafluorophenyl)borate)-2,3,5, 6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2, 3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

Preferred non-coordinating activators for use herein are represented by formula (BF20):

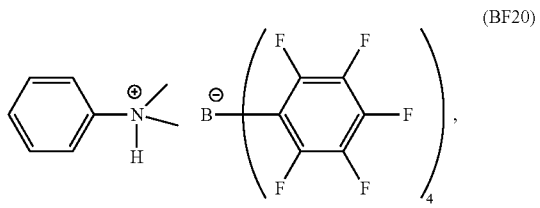

by formula (BF28);

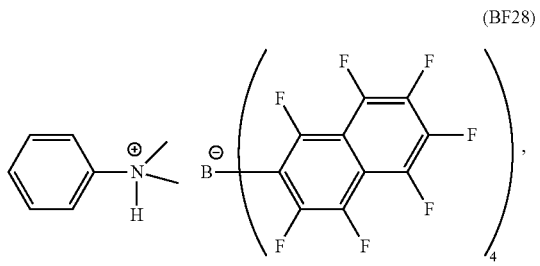

or a combination thereof.

In a preferred embodiment, any of the activators described herein may be mixed together before or after combination with the catalyst compound, preferably before being mixed with the catalyst compound (i.e., the transition metal compound).

In some embodiments two non-coordinating activators may be used in the polymerization and the molar ratio of the first non-coordinating anion activator to the second non-coordinating anion activator can be any ratio. In some embodiments, the molar ratio of the first non-coordinating activator to the second non-coordinating activator is 0.01:1 to 10,000:1, preferably 0.1:1 to 1000:1, preferably 1:1 to 100:1.

Further, the typical activator-to-catalyst ratio, e.g., all non-coordinating activators-to-catalyst ratio is a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

It is also within the scope of this invention that the catalyst compounds can be combined with combinations of alumoxanes and non-coordinating anion activators (see, for example, U.S. Pat. Nos. 5,153,157; 5,453,410; EP 0 573 120 B1; WO 1994/007928; and WO 1995/014044 which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain Transfer Agents

This invention further relates to methods to polymerize olefins using the above catalysts in the presence of a chain transfer agent that may be hydrogen or a main-group metal organometallic compound.

A "chain transfer agent" is any agent capable of hydrocarbyl and/or polymeryl group exchange between a coordinative polymerization catalyst and the chain transfer agent during a polymerization process. The chain transfer agent can be any desirable chemical compound such as those disclosed in WO 2007/130306. Preferably, the chain transfer agent is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where diethylzinc is particularly preferred.

In a particularly useful embodiment, this invention relates to a catalyst system comprising activator, catalyst compound as described herein and chain transfer agent wherein the chain transfer agent is selected from Group 2, 12, or 13 alkyl or aryl compounds.

In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, cyclohexyl, and phenyl.

Useful chain transfer agents are typically present at from 10 or 20 or 50 or 100 equivalents to 600 or 700 or 800 or 1,000 equivalents relative to the catalyst component. Alternately the chain transfer agent ("CTA") is preset at a catalyst complex-to-CTA molar ratio of from about 1:3000 to 10:1; alternatively about 1:2000 to 10:1; alternatively about 1:1000 to 10:1; alternatively about 1:500 to 1:1; alternatively about 1:300 to 1:1; alternatively about 1:200 to 1:1; alternatively about 1:100 to 1:1; alternatively about 1:50 to 1:1; alternatively about 1:10 to 1:1.

Useful chain transfer agents include diethylzinc, tri-n-octyl aluminum, trimethylaluminum, triethylaluminum, triisobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

Polymerization Processes

In embodiments herein, the invention relates to polymerization processes where monomer (such as propylene), and optionally comonomer, are contacted with a catalyst system comprising an activator, preferably a non-coordinating anion activator, and at least one metallocene compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomer comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Polymerization processes of this invention can be carried out in any manner known in the art. Any homogeneous, bulk, solution (including supercritical) phase polymerization process known in the art can be used. Such processes can be run in a batch, semi-batch, or continuous mode. Homogeneous polymerization processes and slurry processes are preferred. A homogeneous polymerization process is defined to be a process where at least 90 wt % of the product is soluble in the reaction media. A homogeneous process is particularly preferred. The monomer itself is also used as a solvent/diluent in a bulk polymerization process. A bulk process is typically a process where monomer concentration in all feeds to the reactor is 70 vol % or more. Alternately, no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % or less, preferably 40 vol % or less, or preferably 20 vol % or less, based on the total volume of the feed stream. Preferably, the polymerization is run in a solution process.

Preferred polymerizations can be run at any temperature and/or pressure suitable to obtain the desired polymers. Typical temperatures and/or pressures include a temperature in the range of from about 60° C. to about 300° C., from about 65° C. to about 300° C., from about 70° C. to about 300° C., preferably from about 73° C. to about 200° C., preferably from about 75° C. to about 150° C., preferably from about 80° C. to about 120° C., preferably from about 85° C. to about 110° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time (also referred as residence time) of the reaction is up to 300 minutes, preferably in the range of from about 5 to 250 minutes, or preferably from about 10 to 120 minutes.

In another embodiment of the invention, the polymerization temperature is preferably from about 60° C. or higher, preferably from about 70° C. or higher, preferably from about 80° C. or higher, preferably from about 90° C. or higher, preferably from about 95° C. or higher, alternately from 60, 70, 80, 90 or 95° C. to 200 or 150° C. and the polymerization process is a homogeneous process, preferably a solution process.

In some embodiments, hydrogen is present in the polymerization reactor at a partial pressure of 0.001 to 50 psig (0.007 to 345 kPa), preferably from 0.01 to 25 psig (0.07 to 172 kPa), more preferably from 0.1 to 10 psig (0.7 to 70 kPa). In some embodiments, hydrogen is not added the polymerization reactor, i.e., hydrogen may be present from other sources, such as a hydrogen generating catalyst, but none is added to the reactor. Alternatively, the hydrogen concentration is 10,000 ppm or less in the feed, preferably 5,000 ppm or less.

In an embodiment of the invention, the activity of the catalyst is at least 50 g/mmol/hour, preferably 500 g/mmol/hour or more, preferably 5000 g/mmol/hr or more, preferably 50,000 g/mmol/hr or more, preferably 100,000 g/mmol/hr or more, preferably 150,000 g/mmol/hr or more, preferably 200,000 g/mmol/hr or more, preferably 250,000 g/mmol/hr or more, preferably 300,000 g/mmol/hr or more, preferably 350,000 g/mmol/hr or more. Likewise, the conversion of olefin monomer is at least 10%, based upon polymer yield and the weight of the monomer entering the reaction zone, preferably 20% or more, preferably 30% or more, preferably 50% or more, preferably 80% or more.

Alternatively, the inventive catalysts have catalyst activity higher than 400,000 kg of polymer per kg of catalyst or more, 500,000 kg of polymer per kg of catalyst or more, 600 kg of polymer per kg of catalyst or more when polymerization occurs in a continuous process.

In a preferred embodiment, little or no scavenger is used in the polymerization process. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 70° C. or higher (preferably 80° C. or higher, preferably 85° C. or higher); 2) is conducted at a pressure of atmospheric pressure to 10 MPa (preferably from 0.35 to 10 MPa, preferably from 0.45 to 6 MPa, preferably from 0.5 to 4 MPa); 3) is conducted in an aliphatic hydrocarbon solvent (such as, isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics (such as toluene) are preferably present in the solvent at less than 1 wt %, preferably less than 0.5 wt %, preferably at 0 wt % based upon the weight of the solvents); 4) ethylene is present in the polymerization reactor at a partial pressure of 0 to 1,000 psig (0 to 6900 kPa), preferably 5 to 300 psig (34 to 2068 kPa), more preferably 10 to 100 psig (69 to 690 kPa); 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally, scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)).

In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Other additives may also be used in the polymerization, as desired, such as one or more scavengers, promoters, modifiers, chain transfer agents (such as diethyl zinc or hydrogen), reducing agents, oxidizing agents, hydrogen, aluminum alkyls, or silanes.

Solution Phase Polymerization

As used herein, the phrase "solution phase polymerization" refers to a polymerization system where the polymer produced is soluble in the polymerization medium under the reaction condition. Generally this involves polymerization in a continuous reactor in which the polymer formed and the starting monomer and catalyst materials supplied, are agitated to reduce or avoid concentration gradients and in which the monomer acts as a solvent or in which a hydrocarbon is used as solvent. Suitable processes typically operate at temperatures from about 60° C. to about 250° C., preferably from about 64° C. to about 200° C., preferably from about 70° C. to about 180° C., more preferably from about 73° C. to about 180° C., more preferably from about 80° C. to about 180° C. and at pressures of about 0.1 MPa or more, preferably 2 MPa or more. The upper pressure limit is not critically constrained but typically can be about 200 MPa or less, preferably 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

In a preferred embodiment, the polymerization process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution.

Preferably, in a continuous process, the mean residence time in the reactor generally can be from about 5 minutes to about 8 hours, and preferably from about 10 minutes to about 6 hours, more preferably from 10 minutes to 1 hour. In some embodiments, comonomer (such as ethylene) can be added to the reaction vessel in an amount to maintain a differential pressure in excess of the combined vapor pressure of the main monomer (such as a propylene) and any optional diene monomers present.

The processes discussed and described herein can be carried out in continuous stirred tank reactors, batch reactors, or plug flow reactors. One reactor can be used even if sequential polymerizations are being performed, preferably as long as there is separation in time or space of the two reactions. Likewise, two or more reactors, operating in series or parallel, can also be used. These reactors can have, or not have, internal cooling and the monomer feed may or may not be refrigerated. See the general disclosure of U.S. Pat. No. 5,001,205 for general process conditions. See also, WO 1996/033227 and WO 1997/022639.

Supercritical or Super solution Polymerization

In aspects of the invention, the processes and/or catalyst compositions disclosed herein may be used in a supercritical or super solution phase. A supercritical polymerization means a polymerization process is operated at or above supercritical state. In super critical state, the polymerization system is in a dense fluid (i.e., its density is 300 kg/m$^3$ or higher), supercritical state. The terms "dense fluid" and "supercritical state" are defined in U.S. Pat. No. 7,812,104. A super solution polymerization is referred as a process where the monomer concentration in the polymerization reactor is high. Super solution polymerization can occur at a temperature of 65° C. to 150° C., preferably from about 75° C. to about 140° C., preferably from about 90° C. to about 140° C., more preferably from about 100° C. to about 140° C., and at pressures of between 1.72 MPa and 35 MPa, preferably between 5 and 30 MPa. For further information on supercritical and super solution polymerizations, please see U.S. Pat. Nos. 7,812,104; 8,008,412; 7,812,104; 9,249,239; 7,729,536; 8,058,371; and US 2008/0153997.

Polyolefin Products

In a preferred embodiment, the process described herein produces propylene homopolymers or propylene copolymers, such as propylene-ethylene and/or propylene-alpha-olefin (preferably $C_4$ to $C_{20}$) copolymers (such as propylene-hexene copolymers or propylene-octene copolymers), preferably having: an Mw/Mn of greater than 1 to 6 (preferably greater than 2 to 4). Alternatively, the Mw/Mn is less than 4, less than 3, or less than 2.5.

Likewise, the process of this invention produces olefin polymers, preferably polypropylene homopolymers and copolymers. In a preferred embodiment, the polymers produced herein are homopolymers of propylene, are copolymers of propylene preferably having from 0 to 50 mol % (alternately from 0.5 to 25 mol %, alternately from 0.5 to 20 mol %, alternately from 1 to 15 mol %, preferably from 3 to 10 mol %) of one or more of ethylene or $C_4$ to $C_{20}$ olefin comonomer (preferably ethylene or $C_4$ to $C_{12}$ alpha-olefin, preferably ethylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the polymer comprises propylene and from about 1 wt % to about 40 wt % ethylene, based on the weight of the polymer, and has an Mw of greater than or equal to about 48,000 g/mol, preferably greater than or equal to about 60,000 g/mol, preferably greater than or equal to about 60,000 g/mol, preferably greater than or equal to about 80,000 g/mol, preferably greater than or equal to about 90,000 g/mol, preferably greater than or equal to about 100,000 g/mol, preferably greater than or equal to about 110,000 g/mol, as determined by GPC-4D. In one or more embodiments, the polymer is a comonomer comprising propylene and ethylene, wherein the polymer comprises greater than or equal to about 3 wt % to about 40 wt % ethylene, based on the weight of the polymer, and has an Mw of greater than or equal to about 100,000 g/mol or more, as determined by GPC-4D.

Typically, the polymers produced herein have an Mw/Mn (as measured by GPC-4D) of greater than 1 to 40, preferably 1 to 20, preferably 1.1 to 15, preferably 1.2 to 10, preferably 1.3 to 5, preferably 1.4 to 4, preferably 1.8 to 3. Preferably the polymers produced herein have an Mw/Mn of greater than 1 to 6 (preferably greater than 2 to 4). Alternatively, the Mw/Mn is less than 4, less than 3, or less than 2.5.

In a preferred embodiment, the polymer produced herein has a unimodal or multimodal molecular weight distribution as determined by Gel Permeation Chromatography (GPC). By "unimodal" is meant that the GPC trace has one peak. By "multimodal" is meant that the GPC trace has at least two peaks or more than three inflection points. An inflection point is that point where the second derivative of the curve changes in sign (e.g., from negative to positive or vice versus).

The polymer produced herein can have a melting point (Tm, DSC peak in second melt) of at least 10° C., at least 20° C., or at least 30° C., or at least 50° C., or at least 60° C. For example, the polymer can have a melting point from at least 10° C. to about 130° C. Alternatively, the polymer produced herein has a melting temperature (Tm, DSC peak in second melt) of 10° C. or less, preferably 5° C. or less. In another embodiment, the polymer produced herein is amorphous without measurable melting temperature (DSC).

The polymer produced herein can have a melt flow rate (MFR, ASTM 1238, 2.16 kg, 230° C.) from a low of about 0.1 dg/min, about 0.2 dg/min, about 0.5 dg/min, about 1 dg/min, about 15 dg/min, about 30 dg/min, or about 45 dg/min to a high of about 200 dg/min, about 300 dg/min, about 500 dg/min, or about 1500 dg/min.

The melt flow rate of the polymers produced herein is function of polymerization temperature and ethylene content in the polymer. In one embodiment, the polymer has a melt flow rate (in g/10 min) of less than [0.007*EXP(0.105*T)], where T is polymerization temperature in degree C.

In one embodiment, the polymer produced herein has long chain branched architecture with a branching index ($g'_{vis}$) of 0.97 or less, preferably 0.95 or less, preferably 0.90 or less. The branching index ($g'_{vis}$) is determined using GPC-4D.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer produced herein is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing propylene polymers or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 m. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

This invention further relates to:

1A. A transition metal compound, useful for polymerizing propylene and optional olefin (preferably alpha-olefin) comonomer, represented by formula (I) or (II):

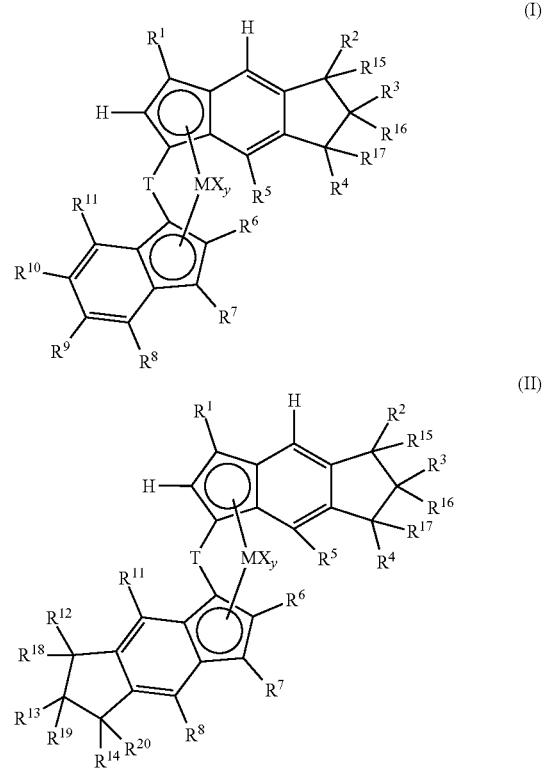

wherein each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$, is independently, hydrogen, halogen, or a monovalent hydrocarbyl radical comprising from one to twenty carbon atoms, silicon atoms, germanium atoms, or a combination thereof, optionally two or more of $R^1$, $R^2$, $R^3$, $R^4$, $R^5$, $R^{15}$, $R^{16}$, and $R^{17}$, or two or more of $R^6$, $R^7$, $R^8$, $R^9$, $R^{10}$, $R^{11}$ in formula (I), or two or more of $R^6$, $R^7$, $R^8$, $R^{11}$, $R^{12}$, $R^{13}$, $R^{14}$, $R^{18}$, $R^{19}$, $R^{20}$ in formula (II), form a saturated or unsaturated ring comprising three or more carbon atoms, silicon atoms, germanium atoms, or a combination thereof;

M is a group 2, 3 or 4 transition metal;

T is a divalent bridging group represented by formula (BR):

wherein E is C, Si, or Ge when n=1;

wherein E is Si and/or Ge when n is 2 or more;

each R' and R" is, independently, hydrogen, halogen, a monovalent substituted or unsubstituted hydrocarbyl radical comprising from one to twenty carbon atoms, or R' and R" form a substituted or unsubstituted cyclic structure including an aromatic ring system, a partially saturated ring system, or a saturated ring system comprising three or more carbon atoms;

y is 1 or 2; and
each X is a leaving group independently comprising a halogen, a monovalent hydrocarbyl radical comprising from one to twenty carbon atoms, unsubstituted or substituted with one or more functional groups, wherein the functional group is an amine, imide, amide, ether, alcohol, hydroxide, sulfide, sulfate, phosphide, halide, phosphonate, alkoxide, ester, carboxylate, aldehyde or combination thereof, or two X groups join together to form a $C_4$ to $C_{62}$ cyclic or polycyclic ring structure when y=2.

2A. The transition metal compound according to embodiment 1A, wherein $R^1$ is hydrogen, $R^5$ is hydrogen; or a combination thereof.

3A. The transition metal compound according to embodiment 1A or 2A wherein when represented by formula (I), nine or more of $R^1$, $R^2$, $R^3$, $R^4$, $R^5$, $R^6$, $R^7$, $R^8$, $R^9$, $R^{10}$, $R^{15}$, $R^{16}$, and $R^{17}$ are hydrogen; or when represented by formula (II), eleven or more of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ are hydrogen.

4A. The transition metal compound according to any one of embodiments 1A through 3A, wherein E is Si; each of R' and R" is independently, a monovalent alkyl radical having from 1 to 4 carbon atoms, a benzyl radical, or a monovalent aromatic radical having from 6 to 10 carbon atoms; and n is 1.

5A. The transition metal compound according to any one of embodiments 1A through 4A, wherein when represented by formula (I), each of $R^1$, $R^2$, $R^3$, $R^4$, $R^5$, $R^6$, $R^7$, $R^8$, $R^9$, $R^{10}$, $R^{15}$, $R^{16}$, and $R^{17}$ is hydrogen; M is a group 4 transition metal; E is Si; each of R' and R' is, independently, a monovalent $C_1$ to $C_4$ alkyl radical; n is 1; and y is 2.

6A. The transition metal compound according to any one of embodiments 1A through 5A, wherein when represented by formula (I): i) $R^1$ is hydrogen; ii) $R^5$ is hydrogen; or iii) each of $R^1$, $R^2$, $R^3$, $R^4$, $R^5$, $R^6$, $R^7$, $R^{10}$, $R^{11}$, $R^{15}$, $R^{16}$, and $R^{17}$ is hydrogen; $R^8$, and $R^9$ are bridged together forming a 6 membered aromatic ring; M is a group 4 transition metal; E is Si; each of R' and R" is, independently, a monovalent $C_1$ to $C_4$ alkyl radical; n is 1; and y is 2.

7A. The transition metal compound according to any one of embodiments 1A through 6A, wherein when represented by formula (II), each of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ is hydrogen; M is a group 4 transition metal; E is Si; each of R' and R" is, independently, a monovalent $C_1$ to $C_4$ alkyl radical; n is 1; and y is 2.

8A. The transition metal compound according to any one of embodiments 1A through 7A, wherein when represented by formula (II), each of $R^1$, $R^2$, $R^3$, $R^4$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ is hydrogen; $R^5$ is a phenyl moiety; M is a group 4 transition metal; E is Si; each of R' and R" is, independently, a monovalent $C_1$ to $C_4$ alkyl radical; n is 1; and y is 2.

9A. The transition metal compound according to any one of embodiments 1A through 8A, wherein M is Hf.

10A. A catalyst system useful for polymerizing propylene and optional olefin (preferably alpha-olefin) comonomer comprising a transition metal compound according to any one of embodiments 1A through 9A, and a non-coordinating anion activator.

11A. The catalyst system, of embodiment 10A, wherein the non-coordinating anion activator comprises a cationic moiety represented by formula (CT) and an anionic moiety represented by formula (A):

$(NHR^a R^b R^c)^+$  (CT)

$(B(F\text{-}AR)_4)^-$;  (A)

wherein each of $R^a$, $R^b$, and $R^c$ is, independently, a $C_1$-$C_{10}$ hydrocarbyl, substituted hydrocarbyl, halocarbyl, or substituted halocarbyl; B is boron, and where (F-AR) is an at least partially fluorinated aromatic hydrocarbon having from 6 to 14 carbon atoms.

12A. The catalyst system according to embodiment 11A, wherein the anionic moiety is represented by formula (AI):

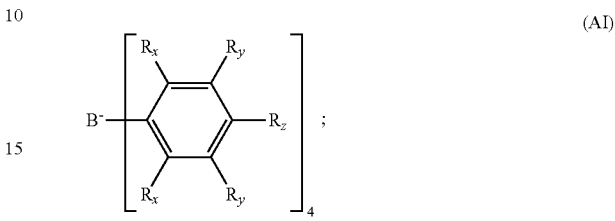
(AI)

where:
each $R_x$ is, independently, a halide, preferably a fluoride;
each $R_y$ is, independently, a halide, a $C_6$ to $C_{20}$ substituted aromatic hydrocarbyl group or a siloxy group of the formula —O—Si—$R^\#$, where each $R^\#$ is independently a $C_1$ to $C_{20}$ hydrocarbyl or hydrocarbylsilyl group, preferably $R_y$ is a fluoride or a perfluorinated phenyl group;
each $R_z$ is a halide, $C_6$ to $C_{20}$ substituted aromatic hydrocarbyl group or a siloxy group of the formula —O—Si—$R^\#$, where each $R^\#$ is independently a $C_1$ to $C_{20}$ hydrocarbyl or hydrocarbylsilyl group, preferably $R_z$ is a fluoride or a $C_6$ perfluorinated aromatic hydrocarbyl group; wherein $R_y$ and $R_z$ can form one or more saturated or unsaturated, substituted or unsubstituted rings, preferably $R_y$ and $R_z$ form a perfluorinated phenyl ring.

13A. The catalyst system according to embodiment 10A, wherein the non-coordinating activator is represented by formula (BF20):

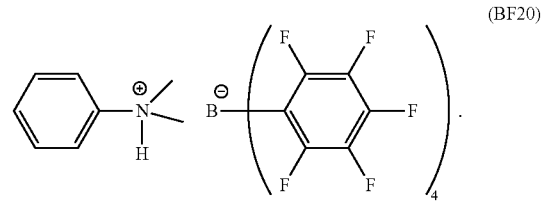
(BF20)

14A. The catalyst system according to embodiment 10A, wherein the non-coordinating activator is represented by formula (BF28).

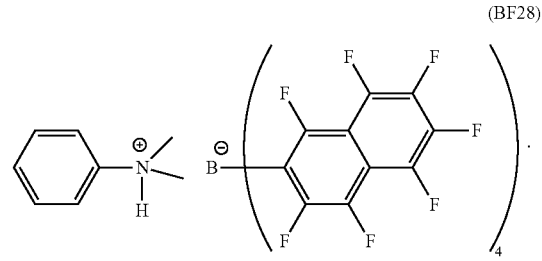
(BF28)

15A. The catalyst system according to any one of embodiments 10A through 14A, wherein when the transition metal compound is represented by formula (I), nine or more of $R^1$, $R^2$, $R^3$, $R^4$, $R^5$, $R^6$, $R^7$, $R^8$, $R^9$, $R^{10}$, $R^{15}$, $R^{16}$, and $R^{17}$ are hydrogen; or when the transition metal compound is represented by formula (II), eleven or more of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ are hydrogen.

16A. The catalyst system according to any one of embodiments 10A through 15A, wherein E is Si; each of R' and R' is independently, a monovalent alkyl radical having from 1 to 4 carbon atoms, a benzyl radical, or an aromatic radical having from 6 to 10 carbon atoms; and n is 1.

17A. The catalyst system according to any one of embodiments 10A through 16A, wherein:

i) the transition metal compound is represented by formula (I) and each of $R^1$, $R^2$, $R^3$, $R^4$, $R^5$, $R^6$, $R^7$, $R^1$, $R^9$, and $R^{10}$ is hydrogen;

ii) the transition metal compound is represented by formula (I) and each of $R^1$, $R^2$, $R^3$, $R^4$, $R^5$, $R^6$, $R^7$, $R^{10}$ and $R^{11}$ is hydrogen; and $R^8$, and $R^9$ are bridged together forming a 6 membered aromatic ring;

iii) the transition metal compound is represented by formula (II), and each of $R^1$, $R^2$, $R^3$, $R^4$, $R^5$, $R^6$, $R^7$, $R^8$, $R^{11}$, $R^{12}$, $R^{13}$, and $R^{14}$ is hydrogen; or iv) the transition metal compound is represented by formula (II), each of $R^1$, $R^2$, $R^3$, $R^4$, $R^6$, $R^7$, $R^8$, $R^{11}$, $R^{12}$, $R^{13}$, and $R^{14}$ is hydrogen; and $R^5$ is a phenyl moiety; and M is a group 4 transition metal; E is Si; each of R' and R" is, independently, a monovalent $C_1$ to $C_4$ alkyl radical; n is 1; and y is 2.

18A. The catalyst system according to any one of embodiments 10A through 17A, wherein M is Hf.

19A. A process to polymerize propylene comprising contacting, at a temperature of 60° C. or more, propylene and at least one comonomer with catalyst system according to any one of embodiments 10A through 18A and obtaining a polymer comprising from 0.5 to 60 weight % of the comonomer, based upon the weight of the polymer.

20A. The process according to embodiment 19A, wherein the process occurs at a temperature of from about 73° C. to about 200° C., at a pressure in the range of from about 0.35 MPa to about 10 MPa, and at a time up to 300 minutes.

21A. The process according to any one of embodiments 19A through 20A, wherein the polymerization occurs in the solution phase.

22A. The process according to any one of embodiments 19A through 21A, wherein the catalyst activity is 400,000 kg of polymer per kg of catalyst or more.

23A. The process according to any one of embodiments 19A through 22A, wherein the polymer comprises from about 1 wt % to about 40 wt % ethylene comonomer, based on the weight of the polymer, and has an Mw of about 48,000 g/mol or more, as determined by GPC-4D.

24A. The process according to any one of embodiments 19A through 23A, wherein the polymer comprises about 3 wt % to about 40 wt % ethylene comonomer, based on the weight of the polymer, and has an Mw of about 100,000 g/mol or more, as determined by GPC-4D.

25A. The process according to any one of embodiments 19A through 24A, wherein the polymer has a melt flow rate according to the equation:

MFR<[0.007*EXP(0.105*T)]g/10 min, wherein T is the polymerization temperature in ° C., when determined according to ASTM 1238, 2.16 kg, 230° C.

26A. The process according to any one of embodiments 19A through 25A, wherein the polymer has a molecular weight distribution of 3.0 or less.

27A. The process according to any one of embodiments 19A through 26A, wherein the polymer produced herein has a branching index ($g'_{vis}$) of 0.95 or less, preferably 0.90 or less.

EXPERIMENTAL

TNOAL is tri-n-octyl aluminum.

The non-coordinating activators are represented by the following formulae,

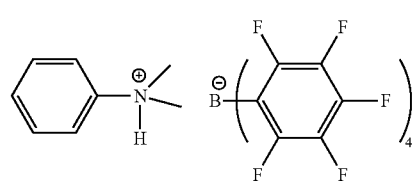

BF20

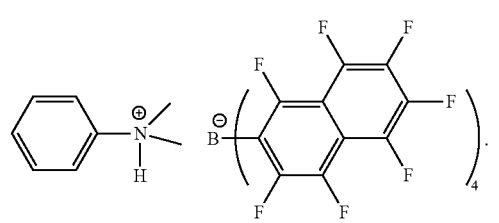

BF28

The metallocene catalysts utilized are represented by the following formulae:

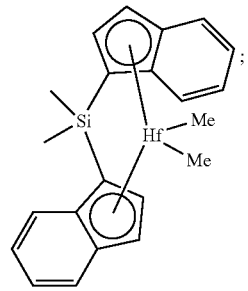

(Comparative-1);

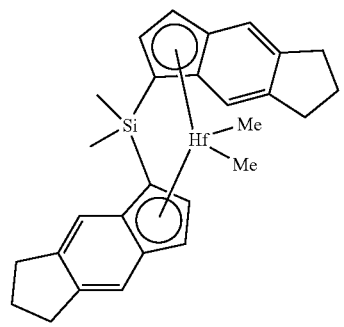

rac-dimethylsilyl bis(1,5,6,7-tetrahydro-s-indacenyl) hafnium dimethyl (MCN-2);

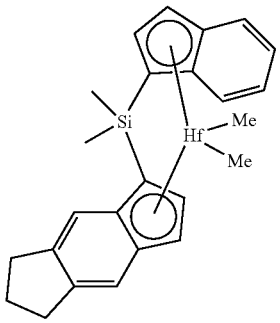

rac-dimethylsilyl (indenyl)(1,5,6,7-tetrahydro-s-indacenyl) hafnium dimethyl (MCN-3)

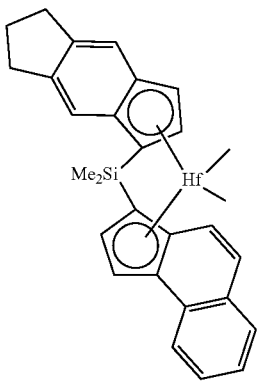

rac-dimethylsilyl (benz[e]inden-3-yl)(1,5,6,7-tetrahydro-s-indacenyl) hafnium dimethyl (MCN-4)

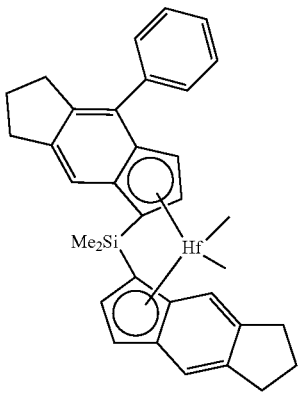

rac-dimethylsilyl (1,5,6,7-tetrahydro-s-indacenyl) (4-phenyl-1,5,6,7-tetrahydro-s-indacenyl)hafnium dimethyl (MCN-5).

Metallocene catalysts MCN-2, MCN-3, MCN-4 and MCN-5 were synthesized as described below.

Characterization

Differential Scanning Calorimetry Peak melting point, (Tm, also referred to as melting point or melting temperature), peak crystallization temperature (Tc, also referred to as crystallization temperature), glass transition temperature (Tg), heat of fusion (Hf), and percent crystallinity were determined using the following DSC procedure according to ASTM D3418-03, expect as noted below. Differential scanning calorimetric (DSC) data were obtained using a TA Instruments model Q200 instrument. Samples weighing approximately 5-10 mg were sealed in an aluminum hermetic sample pan. The DSC data were recorded by first heating the sample to 200° C. at a rate of 10° C./minute. The sample was kept at 200° C. for 2 minutes, then cooled to −70° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the *Polymer Handbook*, Fourth Edition, published by John Wiley and Sons, New York 1999, provided, however, that a value of 189 J/g is used as the heat of fusion for 100% crystalline polypropylene, a value of 290 J/g is used for the heat of fusion for 100% crystalline polyethylene. The melting and crystallization temperatures reported here were obtained during the first cooling/second heating cycle unless otherwise noted.

For polymers displaying multiple endothermic and exothermic peaks, all the peak crystallization temperatures and peak melting temperatures are reported. The heat of fusion for each endothermic peak is calculated individually. The percent crystallinity is calculated using the sum of heat of fusions from all endothermic peaks. Some polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample is aged (typically by holding it at ambient temperature for a period of 2 days) or annealed to maximize the level of crystallinity.

Melt flow rates (MFR) were determined using ASTM D1238 at 2.16 kg and 230° C. High load melt flow rates (HLMFR) were determined using ASTM D1238 at 21.6 kg and 230° C.

GPC 4D Procedure:

The distribution and the moments of molecular weight ($M_w$, $M_n$, $M_w/M_n$, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector, and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors is contained in an oven maintained at 145° C. The polymer sample is weighed and sealed in a standard vial with 80 μL of a flow marker (Heptane) added to it. After loading the vial in the autosampler, polymer is automatically dissolved in the instrument with 8 ml of added TCB solvent.

The polymer is dissolved at 160° C. with continuous shaking for about 1 hour for PE samples or 2 hour for PP samples. The TCB densities used in concentration calculation are 1.463 g/ml at about 23° C. temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation:

$c=\beta I$, where $\beta$ is the mass constant.

The mass recovery is calculated from the ratio of the integrated area of the concentration chromatography over elution volume and the injection mass which is equal to the pre-determined concentration multiplied by injection loop volume. The conventional molecular weight (IR MW) is determined by combining the universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}=0.67$ and $K_{PS}=0.000175$ while $\alpha$ and K are for other materials as calculated and published in literature (Sun, T. et al. (2001) *Macromolecules*, v. 34, pg. 6812), except that for purposes of this invention and claims thereto, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^{\wedge})$ for ethylene-butene copolymer where w2b is a bulk weight percent of butene comonomer, a is 0.695 and K is $0.000579*(1-0.0075*w2b)$ for ethylene-hexene copolymer where w2b is a bulk weight percent of hexene comonomer, and $\alpha$ is 0.695 and K is $0.000579*(1-0.0077*w2b)$ for ethylene-octene copolymer where w2b is a bulk weight percent of octene comonomer, and $\alpha=0.695$ and $K=0.000579$ for all other linear ethylene polymers. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the number of methyl substitutions per 1,000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The wt % of comonomer is then obtained from the following expression in which f is 0.3, 0.4, 0.6, 0.8, and so on for C$_3$, C$_4$, C$_6$, C$_8$, and so on co-monomers, respectively:

$w2=f*SCB/1000TC$.

The bulk composition of the polymer from the GPC-IR and GPC-4D analyses is obtained by considering the entire signals of the CH$_3$ and CH$_2$ channels between the integration limits of the concentration chromatogram. First, the Bulk IR ratio is obtained according to the following equation:

$$\text{Bulk } IR \text{ ratio} = \frac{\text{Area of CH}_3 \text{ signal within integration limits}}{\text{Area of CH}_2 \text{ signal within integration limits}}.$$

Next, the same calibration of the CH$_3$ and CH$_2$ signal ratio, as mentioned previously in obtaining the CH$_3$/1000TC as a function of molecular weight, is applied to obtain the bulk CH$_3$/1000TC. A bulk methyl chain ends per 1000TC (bulk CH$_3$ end/1000TC) is obtained by weight-averaging the chain-end correction over the molecular-weight range. It then follows that:

$w2b=f*\text{bulk CH}_3/1000\text{TC}$ $\text{bulk SCB}/1000\text{TC}=\text{bulk CH}_3/1000\text{TC}-\text{bulk CH}_3\text{end}/1000\text{TC}$ and bulk SCB/1000TC is converted to bulk w2 in the same manner as described above.

The LS detector employed is the 18-angle Wyatt Technology High Temperature DAWN HELEOSII™. The LS molecular weight (M) at each point in the chromatogram is determined by analyzing the LS output using the Zimm model for static light scattering (*Light Scattering from Polymer Solutions*; Huglin, M. B., Ed.; Academic Press, 1972) according to the following relationship:

$$\frac{K_o c}{\Delta R(\theta)} = \frac{1}{MP(\theta)} + 2A_2 c.$$

Wherein $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and Ko is the optical constant for the system, as determined by the equation:

$$K_o = \frac{4\pi^2 n^2 (dn/dc)^2}{\lambda^4 N_A},$$

where $N_A$ is Avogadro's number, and (dn/dc) is the refractive index increment for the system, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta$s, for the solution flowing through the viscometer is calculated from their outputs. The intrinsic viscosity, [$\eta$], at each point in the chromatogram is calculated from the equation $[\eta]=\eta s/c$, where c is concentration and is determined from the IR5 broadband channel output. The viscosity MW at each point is calculated as $$M=K_{PS}M^{\alpha_{PS}+1}/[\eta],$$

where $\alpha_{ps}$ is 0.67 and $K_{ps}$ is 0.000175.

The branching index ($g'_{vis}$) is calculated using the output of the GPC-IR5-LS-VIS according to the following: the average intrinsic viscosity, $[\eta]avg$, of the sample is calculated by:

$$[\eta]_{avg} = \frac{\sum c_i[\eta]_i}{\sum c_i},$$

where the summations are over the chromatographic slices, i, between the integration limits. The branching index g'vis is defined as:

$$g'_{vis} = \frac{[\eta]_{avg}}{KM_v^\alpha}$$

where Mv is the viscosity-average molecular weight based on molecular weights determined by LS analysis and the K and α are for the reference linear polymer, which are, for purposes of this invention and claims thereto, α=0.705 and K=0.0002288 for linear propylene polymers, α=0.695 and K=0.000181 for linear butene polymers, α is 0.695 and K is 0.000579*(1–0.0087*w2b+0.000018*(w2b)^) for ethylene-butene copolymer where w2b is a bulk weight percent of butene comonomer, α is 0.695 and K is 0.000579*(1–0.0075*w2b) for ethylene-hexene copolymer where w2b is a bulk weight percent of hexene comonomer, and α is 0.695 and K is 0.000579*(1–0.0077*w2b) for ethylene-octene copolymer where w2b is a bulk weight percent of octene comonomer, and α=0.695 and K=0.000579 for all other linear ethylene polymers. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

All molecular weights are weight average unless otherwise noted. All molecular weights are reported in g/mol unless otherwise noted.

Synthesis of Metallocene Compounds

Catalyst MCN-2 Synthesis

Bis(1,5,6,7-tetrahydro-s-indacenyl) dimethylsilane

Me$_2$SiCl$_2$ (neat, 0.524 g) was added to a stirring cold slurry of lithium 1,5,6,7-tetrahydro-s-indacenide (1.34 g) in Et2O (40 mL). The white slurry was stirred at room temperature for 24 hours. The mixture was evaporated to dryness. To the residue was added hexane (50 mL) and slurry was stirred at room temperature for 2 hours. The mixture was filtered via Celite on a frit and the frit was washed with hexane (20 mL). All filtrates were combined and concentrated to dryness in vacuo to give pale yellow residue: 1.04 g. The crude product will be used without further purification.

Dilithium dimethylsilyl bis(1,5,6,7-tetrahydro-s-indacenide)

nBuLi (2.5M, 2.4 mL) was added to a cold solution of the above crude product (1.04 g) in Et2O (30 mL). The light orange solution was stirred at room temperature for 21 hours. The mixture was evaporated to dryness.

Rac-dimethylsilyl bis(1,5,6,7-tetrahydro-s-indacenyl) hafnium dichloride

To the above crude product was added HfCl$_4$ (0.904 g). Toluene (25 mL) was added and the yellow slurry was stirred at room temperature for 20 hours. The mixture was evaporated. The residue was washed with hexane (10 mL three times). The yellow solids were then extracted into CH$_2$Cl$_2$ (20 mL). The mixture was filtered through Celite on a frit and additional CH$_2$Cl$_2$ (10 mL twice) was used to wash the Celite. All filtrates were combined and concentrated to dryness. To the residue was added hexane (30 mL) and the yellow slurry was stirred at room temperature for 19 hours. The precipitates were separated and dried in vacuo to give crude product in 1:0.6 rac:meso mixture: 1.1 g. Toluene (20 mL) was added and the slurry was stirred at room temperature for 18 hours. The slurry was filtered on a frit. The yellow precipitates were collected and dried in vacuo to give 0.15 g rac-isomer. The filtrates were concentrated to dryness and toluene (8 mL) is added. The toluene slurry was stirred for 1 hour and filtered again. The yellow precipitates were collected and dried in vacuo to give 0.062 g additional rac-isomer.

$^1$H NMR (400 MHz, CD$_2$Cl$_2$, 23° C.): δ 7.34 (s, 2H), 7.31 (s, 2H), 6.65 (m, 2H), 5.95 (d, 2H), 3.11-2.89 (m, 8H), 2.12-1.97 (m, 4H), 1.09 (s, 6H).

Rac-dimethylsilyl bis(1,5,6,7-tetrahydro-s-indacenyl) hafnium dimethyl (MCN-2)

To a stirring yellow slurry of above rac-isomer (0.15 g) in Et2O (10 mL) was added MeMgBr (3 M in Et2O, 0.19 mL, 0.57 mmol). Additional Et2O (2 mL) was added and the slurry was stirred at room temperature for 3 days. All volatiles were evaporated and to the residue was added hexane (10 mL) and toluene (5 mL) and the slurry was stirred at room temperature (t=0, 11 am). After 2 hours, the mixture was filtered and the light yellow filtrates were concentrated to dryness to give 0.065 g MCN-2.

$^1$H NMR (400 MHz, C$_6$D$_6$, 23° C.): δ 7.34 (s, 2H), 7.26 (s, 2H), 6.68 (d, 2H), 5.72 (d, 2H), 2.94-2.71 (m, 8H), 1.92-1.78 (m, 4H), 0.66 (s, 6H), –1.09 (s, 6H)

Catalyst MCN-3 Synthesis

Chlorodimethyl (1,5,6,7-tetrahydro-s-indacenyl)silane

Me$_2$SiCl$_2$ (7.8 g, neat) was added to pre-cooled slurry of lithium 1,5,6,7-tetrahydro-s-indacenide (0.65 g) in Et2O (30 mL). The off-white slurry was stirred at room temperature for 19 hours. All volatiles were removed in vacuo. The residue was extracted with hexane (50 mL once, 10 mL once) and filtered. The filtrates were concentrated in vacuo to give pale yellow oil: 0.83 g. The product was used without purification.

(Indenyl)(1,5,6,7-tetrahydro-s-indacenyl)dimethylsilane

Lithium indenide (0.407 g) was added to a stirring solution of above product (0.83 g) in Et2O (20 mL). Additional Et2O (10 mL) was added and the slurry was stirred at room temperature for 17 hours. All volatiles were removed in vacuo. The residue was extracted with a mixture of hexane (35 mL) and toluene (10 ml). The filtrates were concentrated in vacuo to give oily residue (1.05 g). The product was used with further purification.

Rac-dimethylsilyl (indenyl)(1,5,6,7-tetrahydro-s-indacenyl) hafnium dichloride To the Et2O (30 mL) solution of the above product (1.05 g), nBuLi (2.5M, 2.7 mL) was added. Additional Et2O (10 mL) was added and the solution was stirred at room temperature for 75 minutes. HfCl4 (1.024 g) and toluene (10 mL) was added and the yellow slurry was stirred at room temperature for 68 hours. The mixture was concentrated to dryness. $CH_2Cl_2$ (20 mL once, 5 mL twice) was used to extract the product and filtrates were concentrated to dryness. Toluene (12 mL) was added and the yellow slurry was stirred at room temperature for 20 minutes and filtered. The yellow solids collected on a frit was washed with hexane (5 mL) and dried in vacuo to give rac-isomer: 0.23 g.

The filtrates were combined and concentrate to dryness. To the residue was added toluene (8 mL) and the yellow slurry was stirred at room temperature for 3 hours. The slurry was filtered and the precipitates were washed with hexane (3 mL) and dried in vacuo to give additional rac-isomer: 0.125 g.

$^1$H NMR (400 MHz, $CD_2Cl_2$, 23° C.): δ 7.55 (m, 2H), 7.35-7.28 (m, 3H), 7.05 (m, 1H), 6.79 (dd, 1H), 6.66 (dd, 1H), 6.07 (d, 1H), 5.97 (d, 1H), 3.12-2.90 (m, 4H), 2.13-1.97 (m, 2H), 1.11 (s, 6H).

Rac-dimethylsilyl (indenyl)(1,5,6,7-tetrahydro-s-indacenyl) hafnium dimethyl (MCN-3)

MeMgBr (3 M in Et2O, 0.19 ml, 0.57 mmol) was added to a stirring slurry of above rac-isomer (0.125 g) in toluene (5 mL) at room temperature. Additional toluene (3 mL) was added. The solution was stirred at 70° C. for 2 hours. The mixture was concentrated to dryness. The residue was extracted with a mixture of toluene (5 mL) and hexane (5 mL). The filtrates were concentrated to dryness. Hexane (1.5 mL) was added and the mixture was concentrated to dryness again to give the product as a pale yellow solid: 0.098 g.

$^1$H NMR (400 MHz, $C_6D_6$, 23° C.): δ 7.50 (dt, 1H), 7.31-7.29 (m, 2H), 7.22 (s, 1H), 7.15 (m, 1H), 6.84 (m, 1H), 6.68 (dd, 1H), 6.61 (dd, 1H), 5.7 (d, 1H), 5.63 (d, 1H), 2.92-2.71 (m, 4H), 1.93-1.76 (m, 2H), 0.62 (s, 3H), 0.60 (s, 3H), −1.10 (s, 3H), −1.15 (s, 3H).

Catalyst MCN-4 Synthesis

Chlorodimethyl (1,5,6,7-tetrahydro-s-indacenyl)silane $Me_2SiCl_2$ (20.7 g, neat) was added to a slurry of lithium 1,5,6,7-tetrahydro-s-indacenide (1.85 g) in Et2O (40 mL). The white slurry was stirred at room temperature for 3 hours. All volatiles were removed in vacuo. The residue was extracted with hexane (60 mL, 5 mL) and hexane filtrates were concentrated to give pale yellow oil (2.7 g). The product was used without further purification.

(Benz[e]indenyl)(1,5,6,7-tetrahydro-s-indacenyl) dimethylsilane

Lithium benz[e]indenide (0.6 g) was added to a stirring solution of above product (0.86 g) in Et2O (30 mL). The slightly cloudy solution was stirred at room temperature for 26 hours. All volatiles were removed. The residue was extracted with a mixture of toluene (15 mL) and hexane (10 mL). The toluene/hexane filtrates were concentrated to pale yellow oil: 1.27 g.

Rac-dimethylsilyl (benz[e]inden-3-yl)(1,5,6,7-tetrahydro-s-indacenyl) hafnium dichloride nBuLi (2.8 mL of 2.5M in Hexanes) was added to a stirring solution of above product (1.27 g) in Et2O (25 mL). The orange solution was stirred at room temperature for 1 hour. HfCl4 (1.075 g) was added followed by toluene (8 mL). The mixture was stirred at room temperature for 69 hours. All volatiles were removed. The residue was extracted with $CH_2Cl_2$ (35 mL, 10 mL). $CH_2Cl_2$ filtrates were concentrated to dryness in vacuo. Toluene (10 mL) was added and the yellow slurry was stirred at room temperature for 1.5 hours. The yellow precipitates were collected on a frit and washed with toluene (1 mL) then pentane (3 mL) and dried in vacuo to give the rac-isomer: 0.265 g.

$^1$H NMR (400 MHz, $CD_2Cl_2$, 23° C.): δ 8.01 (m, 1H), 7.79 (m, 1H), 7.60-7.35 (m, 6H), 7.27 (dd, 1H), 6.68 (dd, 1H), 6.11 (d, 1H), 6.04 (d, 1H), 3.13-2.92 (m, 4H), 2.14-1.98 (m, 2H), 1.14 (s, 3H), 1.13 (s, 3H).

Rac-dimethylsilyl (benz[e]inden-3-yl)(1,5,6,7-tetrahydro-s-indacenyl) hafnium dimethyl (MCN-4)

MeMgBr (3 M in Et2O, 0.3 ml, 0.9 mmol) was added to stirring slurry of above rac-isomer (0.2 g) in toluene (10 mL). Additional toluene (5 mL) was added. The reaction mixture was stirred at 65° C. for 16 hours. All volatiles were removed. The residue was extracted with a mixture of toluene and pentane (1:1, 20 mL) and was filtered through Celite. The Celite was washed with additional toluene/pentane (1:1, 10 mL). All filtrates were combined and were concentrated to dryness in vacuo to give the product as an off-white solid: 0.185 g.

$^1$H NMR (400 MHz, $C_6D_6$, 23° C.): δ 7.94 (m, 1H), 7.64 (m, 1H), 7.38-7.19 (m, 7H), 6.59 (m, 1H), 5.76 (d, 1H), 5.69 (d, 1H), 2.91-2.69 (m, 4H), 1.95-1.76 (m, 2H), 0.65 (s, 3H), 0.62 (s, 3H), −1.15 (s, 3H), −1.32 (s, 3H).

Catalyst MCN-5 Synthesis

Chlorodimethyl (1,5,6,7-tetrahydro-s-indacenyl)silane $Me_2SiCl_2$ (20.7 g, neat) was added to a slurry of lithium 1,5,6,7-tetrahydro-s-indacenide (1.85 g) in Et2O (40 mL). The white slurry was stirred at room temperature for 3 hours. All volatiles were removed in vacuo. The residue was extracted with hexane (60 mL, 5 mL) and hexane filtrates were concentrated to give pale yellow oil (2.7 g). The product was used without further purification.

(1,5,6,7-tetrahydro-s-indacenyl) (4-phenyl-1,5,6,7-tetrahydro-s-indacenyl)dimethylsilane A solution of above product (0.648 g) in Et2O (5 mL) was added to a stirring slurry of Lithium 4-phenyl-1,5,6,7- tetrahydro-s-indacen-1-ide (0.625 g) In Et2O (8 mL). Additional Et2O (2 mL) was added and the cloudy solution was stirred at room temperature for 15 hours. The reaction slurry was concentrated. The residue was extracted with a 1/1 mixture of hexane and toluene (20 mL) and filtered through Celite. The Celite was washed with 1/1 of hexane and toluene (3 mL). All filtrates were combined and were concentrated to sticky solid: 1.13 g.

Rac-dimethylsilyl (1,5,6,7-tetrahydro-s-indacenyl) (4-phenyl-1,5,6,7-tetrahydro-s-indacenyl)hafnium dichloride nBuLi (2.15 mL of 2.5 M solution in hexane) was added to a stirring solution of above product (1.13 g) in Et2O (25 m). The solution was stirred at room temperature for 1.5 hours. HfCl4 (0.814 g) was added followed by 5 mL of toluene. The yellow slurry was stirred at room temperature for 18.5 hours. All volatiles were removed in vacuo. The residue was extracted with $CH_2Cl_2$ (25 mL, 5 mL) and $CH_2Cl_2$ filtrates were concentrated to dryness. To the yellow solid was added toluene (3 mL), became a clear solution. Hexane (6 mL) was added, a yellow slurry formed. The reaction mixture was concentrated to dryness again. Toluene (8 mL) and hexane (8 mL) were added and the mixture was stirred at room temperature for 17 hours. The yellow precipitates were separated and washed with hexane (5 mL) and dried in vacuo to give the rac-isomer: 0.245 g.

$^1$H NMR (400 MHz, $C_6D_6$, 23° C.): δ 7.74 (b, 2H), 7.30-7.07 (m, 6H), 6.92 (dd, 1H), 6.84 (dd, 1H), 5.86 (d, 1H), 5.77 (d, 1H), 3.00-2.65 (m, 8H), 1.92-1.68 (m, 4H), 0.70 (s, 3H), 0.65 (s, 3H).

Rac-dimethylsilyl (1,5,6,7-tetrahydro-s-indacenyl) (4-phenyl-1,5,6,7-tetrahydro-s-indacenyl)hafnium dimethyl (MCN-5)

MeMgBr (3 M in Et2O, 0.27 ml, 0.81 mmol) was added to a slurry of above rac-isomer (0.195 g) in toluene (10 mL). Additional toluene (5 mL) was added. The reaction mixture was stirred at 70° C. for 3 hours. All volatiles were removed. The residue was extracted with 2/1 mixture of hexane and toluene (15 mL) and filtered through Celite on a frit. The frit was washed with additional 2/1 mixture of hexane and toluene (5 mL). The filtrate and washings were combined and were concentrated to give yellow residue. Hexane (3 mL) was added and the mixture was allowed to stay at room temperature for 16 hours. The precipitates were separated and dried in vacuo to give the product as a pale yellow solid: 0.065 g.

$^1$H NMR (400 MHz, $C_6D_6$, 23° C.): δ 7.63 (m, 2H), 7.31-7.09 (m, 6H), 6.89 (dd, 1H), 6.73 (dd, 1H), 5.75 (d, 1H), 5.69 (d, 1H), 2.99-2.67 (m, 8H), 1.90-1.74 (m, 4H), 0.69 (s, 3H), 0.67 (s, 3H), −0.94 (s, 3H), −1.19 (s, 3H).

Small Scale Propylene-Ethylene Copolymerizations

A series of propylene-ethylene copolymerizations were performed in parallel pressure reactors (PPRs) developed by Symyx Technologies, Inc as generally described in U.S. Pat. Nos. 6,306,658; 6,455,316; WO 2000/009255; and Murphy et al. (2003) *J. Am. Chem. Soc.*, v. 125, pp. 4306-4317, each of which is incorporated by reference herein in its entirety. Although specific quantities, temperatures, solvents, reactants, reactants ratios, pressures, and other variables may need to be adjusted from one reaction to the next, the following describes a typical polymerization performed in a parallel, pressure reactor.

A pre-weighed glass vial insert and disposable stirring paddle were fitted to each reaction vessel of the reactor, which contains 48 individual reaction vessels. The reactor was then closed and propylene gas was introduced to each vessel to purge the nitrogen out of the system. If any modules receive hydrogen, it was added during the purge process. The solvent (typically hexane) was added next according to the set total reaction volume, including the following additions to a total volume of about 5 mL. The scavenger and/or other components as indicated were then added. The contents of the vessels were stirred at 800 rpm. The propylene was added as a gas to a set pressure. The reactor vessels were heated to their set run temperature as indicated. Ethylene was added as a gas to a pre-determined pressure above the pressure of the propylene while the reactor vessels were heated to the indicated polymerization reaction temperature.

A toluene solution of catalyst (typically at a concentration of 0.2 mmol/L in toluene which provides about 15 nmol of catalyst) was injected into the reactors. The reaction was then allowed to proceed until a pre-determined amount of pressure had been taken up by the reaction. Alternatively, the reaction may be allowed to proceed for a set amount of time as indicated. The reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product.

The solution copolymerization of propylene and ethylene was performed at 85° C. using the following general conditions: propylene=140 psi; metallocene=15 nmol; activator=16.5 nmol; solvent=hexanes; total volume=5 mL; tri(n-octyl)aluminum=500 nmol. Detailed process condition and characterization data are presented in Table 1. Comp-1 is comparative-1, dimethylsilylbis(indenyl)hafnium dimethyl.

TABLE 1

| Example | Catalyst | Activator | $C_2$ psi (Kpa) | Time (s) | Yield (mg) | Activity (kg mmol · h) |
|---------|----------|-----------|-----------------|----------|------------|------------------------|
| CE1     | Comp-1   | BF20      | 0 (0)           | 58       | 79.2       | 325                    |
| CE2     | Comp-1   | BF20      | 5 (34.5)        | 35       | 86.1       | 597                    |
| CE3     | Comp-1   | BF20      | 10 (68.9)       | 33       | 98.1       | 707                    |
| CE4     | Comp-1   | BF20      | 20 (137.9)      | 24       | 129.7      | 1308                   |
| CE5     | Comp-1   | BF20      | 40 (275.8)      | 14       | 131.6      | 2322                   |
| CE6     | Comp-1   | BF20      | 80 (551.6)      | 6        | 176.9      | 7581                   |
| CE7     | Comp-1   | BF28      | 0 (0)           | 90       | 80.9       | 216                    |
| CE8     | Comp-1   | BF28      | 5 (34.5)        | 62       | 103.4      | 401                    |
| CE9     | Comp-1   | BF28      | 10 (68.9)       | 50       | 110.3      | 526                    |
| CE10    | Comp-1   | BF28      | 20 (137.9)      | 32       | 124.7      | 950                    |
| CE11    | Comp-1   | BF28      | 40 (275.8)      | 17       | 141.4      | 2032                   |

TABLE 1-continued

| | | | | | | | |
|---|---|---|---|---|---|---|---|
| CE12 | Comp-1 | BF28 | 80 | (551.6) | 9 | 169.6 | 4473 |
| E13 | MCN-2 | BF20 | 0 | (0) | 123 | 53.0 | 103 |
| E14 | MCN-2 | BF20 | 5 | (34.5) | 76 | 78.5 | 249 |
| E15 | MCN-2 | BF20 | 10 | (68.9) | 57 | 93.0 | 392 |
| E16 | MCN-2 | BF20 | 20 | (137.9) | 38 | 101.2 | 637 |
| E17 | MCN-2 | BF20 | 40 | (275.8) | 20 | 100.8 | 1241 |
| E18 | MCN-2 | BF20 | 80 | (551.6) | 10 | 156.6 | 3685 |
| E19 | MCN-2 | BF28 | 0 | (0) | 178 | 38.3 | 52 |
| E20 | MCN-2 | BF28 | 5 | (34.5) | 112 | 60.2 | 129 |
| E21 | MCN-2 | BF28 | 10 | (68.9) | 67 | 71.0 | 256 |
| E22 | MCN-2 | BF28 | 20 | (137.9) | 35 | 78.1 | 534 |
| E23 | MCN-2 | BF28 | 40 | (275.8) | 19 | 99.7 | 1246 |
| E24 | MCN-2 | BF28 | 80 | (551.6) | 12 | 135.1 | 2615 |
| E25 | MCN-3 | BF20 | 0 | (0) | 110 | 55.5 | 121 |
| E26 | MCN-3 | BF20 | 5 | (34.5) | 70 | 84.9 | 292 |
| E27 | MCN-3 | BF20 | 10 | (68.9) | 40 | 79.0 | 470 |
| E28 | MCN-3 | BF20 | 20 | (137.9) | 28 | 115.3 | 978 |
| E29 | MCN-3 | BF20 | 40 | (275.8) | 17 | 119.3 | 1735 |
| E30 | MCN-3 | BF20 | 80 | (551.6) | 8 | 170.2 | 4921 |
| E31 | MCN-3 | BF28 | 0 | (0) | 87 | 51.6 | 142 |
| E32 | MCN-3 | BF28 | 5 | (34.5) | 69 | 64.7 | 224 |
| E33 | MCN-3 | BF28 | 10 | (68.9) | 60 | 73.3 | 292 |
| E34 | MCN-3 | BF28 | 20 | (137.9) | 26 | 90.5 | 835 |
| E35 | MCN-3 | BF28 | 40 | (275.8) | 13 | 102.5 | 1907 |
| E36 | MCN-4 | BF20 | 0 | (0) | 104 | 56.3 | 130 |
| E37 | MCN-4 | BF20 | 5 | (34.5) | 116 | 64.5 | 134 |
| E38 | MCN-4 | BF20 | 10 | (68.9) | 56 | 83.4 | 356 |
| E39 | MCN-4 | BF20 | 20 | (137.9) | 42 | 114.5 | 651 |
| E40 | MCN-4 | BF20 | 40 | (275.8) | 21 | 134.3 | 1542 |
| E41 | MCN-4 | BF20 | 80 | (551.6) | 11 | 167.8 | 3596 |
| E42 | MCN-4 | BF28 | 0 | (0) | 174 | 52.6 | 73 |
| E43 | MCN-4 | BF28 | 5 | (34.5) | 163 | 50.4 | 74 |
| E44 | MCN-4 | BF28 | 10 | (68.9) | 84 | 70.5 | 201 |
| E45 | MCN-4 | BF28 | 20 | (137.9) | 62 | 87.0 | 337 |
| E46 | MCN-4 | BF28 | 40 | (275.8) | 21 | 97.1 | 1115 |
| E47 | MCN-4 | BF28 | 80 | (551.6) | 14 | 134.2 | 2268 |
| E48 | MCN-5 | BF20 | 0 | (0) | 119 | 63.3 | 127 |
| E49 | MCN-5 | BF20 | 5 | (34.5) | 126 | 59.0 | 113 |
| E50 | MCN-5 | BF20 | 10 | (68.9) | 63 | 88.6 | 336 |
| E51 | MCN-5 | BF20 | 20 | (137.9) | 46 | 109.3 | 573 |
| E52 | MCN-5 | BF20 | 40 | (275.8) | 25 | 95.3 | 919 |
| E53 | MCN-5 | BF20 | 80 | (551.6) | 15 | 174.6 | 2775 |
| E54 | MCN-5 | BF28 | 0 | (0) | 155 | 46.1 | 72 |
| E55 | MCN-5 | BF28 | 5 | (34.5) | 222 | 38.9 | 42 |
| E56 | MCN-5 | BF28 | 10 | (68.9) | 114 | 47.0 | 99 |
| E57 | MCN-5 | BF28 | 20 | (137.9) | 47 | 85.5 | 439 |
| E58 | MCN-5 | BF28 | 40 | (275.8) | 27 | 107.3 | 940 |
| E59 | MCN-5 | BF28 | 80 | (551.6) | 19 | 130.4 | 1683 |

| Example | $C_2$ (wt %) | Mw (g/mol) | Mn (g/mol) | PDI (Mw/Mn) | Tm (° C.) |
|---|---|---|---|---|---|
| CE1 | | 64303 | 34506 | 1.9 | 126.3 |
| CE2 | 4.3 | 60540 | 28788 | 2.1 | — |
| CE3 | 6.2 | 59374 | 27891 | 2.1 | — |
| CE4 | 11.2 | 58784 | 25705 | 2.3 | — |
| CE5 | 19.5 | 60462 | 25657 | 2.4 | — |
| CE6 | 32.2 | 66182 | 22425 | 3.0 | — |
| CE7 | | 151859 | 75251 | 2.0 | 131.2 |
| CE8 | 3.8 | 141893 | 67814 | 2.1 | — |
| CE9 | 6.5 | 133640 | 63293 | 2.1 | — |
| CE10 | 11.2 | 118206 | 53205 | 2.2 | — |
| CE11 | 19.7 | 113825 | 47164 | 2.4 | — |
| CE12 | 32.6 | 116791 | 41228 | 2.8 | — |
| E13 | | 55342 | 30255 | 1.8 | 128.2 |
| E14 | 4.1 | 59565 | 28626 | 2.1 | — |
| E15 | 6.3 | 61151 | 28395 | 2.2 | — |
| E16 | 12.7 | 72630 | 32125 | 2.3 | — |
| E17 | 22.0 | 88435 | 38199 | 2.3 | — |
| E18 | 35.1 | 100197 | 29971 | 3.3 | — |
| E19 | | 86947 | 44440 | 2.0 | 132.8 |
| E20 | 4.2 | 100070 | 48625 | 2.1 | — |
| E21 | 7.8 | 111204 | 53118 | 2.1 | — |
| E22 | 15.2 | 128182 | 57214 | 2.2 | — |
| E23 | 24.7 | 150283 | 60194 | 2.5 | — |
| E24 | 38.8 | 176384 | 51282 | 3.4 | — |
| E25 | | 60349 | 31576 | 1.9 | 126.9 |
| E26 | 3.9 | 60804 | 29506 | 2.1 | — |
| E27 | 6.1 | 60737 | 28113 | 2.2 | — |
| E28 | 11.5 | 66765 | 28505 | 2.3 | — |

TABLE 1-continued

| | | | | | |
|---|---|---|---|---|---|
| E29 | 20.1 | 72888 | 30772 | 2.4 | — |
| E30 | 33.8 | 79666 | 24149 | 3.3 | — |
| E31 | | 100908 | 49899 | 2.0 | 131.2 |
| E32 | 4.0 | 114080 | 56279 | 2.0 | — |
| E33 | 7.1 | 130965 | 60969 | 2.1 | — |
| E34 | 13.7 | 121368 | 53421 | 2.3 | — |
| E35 | 23.2 | 131482 | 55378 | 2.4 | — |
| E36 | | 45568 | 23918 | 1.9 | 121.2 |
| E37 | 1.3 | 48803 | 25158 | 1.9 | — |
| E38 | 3.7 | 48885 | 24025 | 2.0 | — |
| E39 | 5.8 | 49962 | 23197 | 2.2 | — |
| E40 | 13.8 | 54190 | 23645 | 2.3 | — |
| E41 | 26.4 | 59829 | 21444 | 2.8 | — |
| E42 | | 92660 | 46939 | 2.0 | 127.6 |
| E43 | 1.1 | 99081 | 49267 | 2.0 | — |
| E44 | 3.7 | 117330 | 58149 | 2.0 | — |
| E45 | 6.6 | 118644 | 56299 | 2.1 | — |
| E46 | 16.9 | 120521 | 52970 | 2.3 | — |
| E47 | 28.6 | 134050 | 51966 | 2.6 | — |
| E48 | | 57709 | 28880 | 2.0 | 137.5 |
| E49 | 1.1 | 59992 | 30285 | 2.0 | — |
| E50 | 2.4 | 58124 | 28383 | 2.0 | — |
| E51 | 4.0 | 56629 | 28052 | 2.0 | — |
| E52 | 9.6 | 61698 | 28718 | 2.1 | — |
| E53 | 19.8 | 55697 | 21156 | 2.6 | — |
| E54 | | 89864 | 45826 | 2.0 | 140.6 |
| E55 | 1.0 | 98603 | 50594 | 1.9 | — |
| E56 | 2.8 | 114291 | 57712 | 2.0 | — |
| E57 | 4.6 | 95466 | 46182 | 2.1 | — |
| E58 | 11.8 | 97877 | 43453 | 2.3 | — |
| E59 | 23.4 | 112064 | 44153 | 2.5 | — |

"—" indicates data not available.

In Table 1, $C_2$ is ethylene, $C_2$ wt % is the weight percent of ethylene in the polymer, based on the weight of the polymer, and determined by GPC-4D; Mw is weight average molecular weight determined by GPC-4D, Mn is number average molecular weight determined by GPC-4D, PDI is polydispersity defined as Mw/Mn, and Tm is melting point determined via DSC, second melt.

FIG. 1 shows a plot of weight average molecular weight (g/mol) versus ethylene content (wt %) for ethylene-propylene copolymer produced at 85° C. using catalysts prepared with a comparative catalyst, an inventive catalyst, and two different non-coordinating anion activators according to embodiments disclosed herein. Symbols Used: MCN-2/BF20 (circle-dotted line), MCN-2/BF28 (diamond solid line), comparative "COMP-1/BF20" (triangle dotted line), comparative "COMP-1/BF28" (square solid line).

As these data show, the bridged metallocenes with limited substitutions results in a relatively agile process to polymerizing propylene-ethylene copolymers with improved MW capabilities. As shown in Table 1 and further illustrated in FIG. 1, using borate activator BF20 with the inventive catalyst MCN-2 shows improved molecular weight capability for the production of propylene-ethylene copolymers in solution polymerizations relative to comparative metallocene COMP-1. Using borate activator BF28, when the ethylene ($C_2$) content is over approximately 11-12 wt %, results in propylene-ethylene copolymers having higher Mw than that produced by comparative metallocene COMP-1.

Propylene-Ethylene Copolymerization in a Continuous Stirred Tank Reactor

To further illustrate the instant invention, a propylene-ethylene copolymerization was carried out in a continuous stirred tank reactor system. The configuration of the system is described as follows. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of liquid were controlled using Coriolis mass flow controller (Quantim series from Brooks). Ethylene flowed as a gas under its own pressure through a Brooks flow controller. Monomers (e.g., ethylene and propylene) feeds were combined into one stream and then mixed with a pre-chilled isohexane stream that had been cooled to at least 0° C. The mixture was then fed to the reactor through a single line. Scavenger solution was also added to the combined solvent and monomer stream just before it entered the reactor to further reduce any catalyst poisons. Similarly, catalyst solution was fed to the reactor using an ISCO syringe pump through a separated line. All of the solvent and monomers were purified using columns of alumina and molecular sieves.

An isohexane solution of tri-n-octyl aluminum (TNOAL) (25 wt % in hexane, Sigma Aldrich) was used as scavenger solution. The catalysts MCN-2, MCN-3, MCN-4 and MCN-5 were all preactivated with N,N-dimethylanilinium tetrakis(heptafluoro-2-naphthyl)borate (BF-28) at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. The detailed polymerization process conditions and some characteristic properties are listed in Tables 2 to 5 below. The scavenger feed rate can be adjusted to optimize the catalyst efficiency and the feed rate varied from 0 (no scavenger) to 15 μmol/min. The catalyst feed rates may also be adjusted according to the level of impurities in the system to reach the targeted conversions listed. All the reactions were carried out at a pressure of about 2.4 MPa/g unless indicated otherwise. Both the ethylene content and the molecular weight for polymer samples produced were determined using GPC-4D according to the procedure described above, unless otherwise noted. The values of molecular weight listed in Table 2 to 5 are from the IR detector of the GPC-4D. The ethylene content for polymer produced in E60 was determined using FTIR according to the procedure of ASTM D3900.

TABLE 2

| (Example E60) | |
| --- | --- |
| Reaction Temperature (° C.) | 73 |
| Ethylene feed rate (g/min) | 2.83 |
| Propylene feed rate (g/min) | 30 |
| Isohexane feed rate (g/min) | 40.5 |
| Catalyst/Activator | MCN-2/BF-28 |
| Catalyst feed rate (mmol/min) | 0.05796 |
| TNOAL feed rate (mmol/min) | 0.6878 |
| Collection time (min) | 40 |
| Polymer made (gram) | 177.4 |
| Conversion (%) | 13.50% |
| MFR (g/10 min, 2.16 kg, 230° C.) | 0.684 |
| MFR HL (g/10 min 21.6 kg, 230° C.) | 28.401 |
| Ethylene content (wt %) (FTIR) | 25.5% |
| Mw (g/mol) | 297,232 |
| Mn (g/mol) | 127,192 |
| Mw/Mn (—) | 2.34 |

TABLE 3*

| Example # | E61 | E62 | E63 | E64 |
| --- | --- | --- | --- | --- |
| Polymerization temperature ° C.) | 71 | 78 | 83 | 93 |
| Ethylene feed rate (g/min) | 2.8 | 2.8 | 2.8 | 2.8 |
| Propylene feed rate (g/min) | 30 | 30 | 30 | 30 |
| Isohexane feed rate (g/min) | 42.7 | 42.7 | 42.7 | 42.7 |
| MCN-4 feed rate (mmol/min) | 0.02374 | 0.03798 | 0.03798 | 0.04747 |
| Collection time (min) | 20 | 20 | 12 | 20 |
| Polymer made (gram) | 167.1 | 277.5 | 169.9 | 257.9 |
| Conversion (%) | 25.5% | 42.3% | 43.1% | 39.3% |
| Catalyst efficiency (kg polymer/kg catalyst) | 601,560 | 624,375 | 637,125 | 464,220 |
| MFR (g/10 min, 2.16 kg, 230° C.) | 2.2 | 6.2 | 9.7 | 19.6 |
| Mn (g/mol) | 156,136 | 114,572 | 95,563 | 72,093 |
| Mw (g/mol) | 328,971 | 244,887 | 210,676 | 155,106 |
| Mz (g/mol) | 542,676 | 418,736 | 361,645 | 264,276 |
| Mw/Mn (—) | 2.11 | 2.14 | 2.20 | 2.15 |
| g'vis (—) | 1.021 | 1.014 | 1.002 | 0.981 |
| Tc (° C.) | | 17.6 | 18.8 | 25.1 |
| Tm (° C.) | | 54.6 | 55.8 | 58.9 |
| Tg (° C.) | −29.2 | −29.1 | −28.1 | −29.0 |
| Heat of fusion (J/g) | | 8.0 | 9.3 | 1.7 |
| Ethylene content (wt %) | 13.8% | 11.7% | 11.5% | 12.3% |
| EXAMPLE # | E65 | E66 | E67 | E68 |
| Polymerization temperature ° C.) | 100 | 83 | 93 | 103 |
| Ethylene feed rate (g/min) | 2.8 | 2.8 | 2.8 | 2.8 |
| Propylene feed rate (g/min) | 30 | 30 | 30 | 30 |
| Isohexane feed rate (g/min) | 42.7 | 41 | 41 | 41 |
| MCN-4 feed rate (mmol/min) | 0.05697 | 0.03228 | 0.06646 | 0.09495 |
| Collection time (min) | 20 | 18 | 20 | 20 |
| Polymer made (gram) | 368.3 | 219.9 | 421.2 | 463.3 |
| Conversion (%) | 56.1% | 37.2% | 64.2% | 70.6% |
| Catalyst efficiency (kg polymer/kg catalyst) | 552,450 | 646,765 | 541,543 | 416,970 |
| MFR (g/10 min, 2.16 kg, 230° C.) | 93.3 | 18.5 | 80.5 | 315.7 |
| Mn (g/mol) | 45,831 | 77,860 | 50,371 | 35,042 |
| Mw (g/mol) | 105,325 | 170,970 | 117,587 | 85,378 |
| Mz (g/mol) | 189,213 | 302,062 | 219,461 | 161,053 |
| Mw/Mn (—) | 2.30 | 2.20 | 2.33 | 2.44 |
| g'vis (—) | 0.94 | 0.981 | 0.941 | 0.897 |
| Tc (° C.) | 24.9 | 13.5 | 8.4 | 9.0 |
| Tm (° C.) | 58.6 | 56.7 | 60.3 | 64.0 |
| Tg (° C.) | −29.3 | −27.2 | −26.8 | −25.8 |
| Heat of fusion(J/g) | 2.0 | 12.0 | 20.1 | 22.8 |
| Secondary crystallization peak temperature (Tc2) (° C.) | | | 4.4 | 8.4 |
| Ethylene content (wt %) | 10.6% | 10.8% | 9.8% | 9.3% |

TABLE 4

| EXAMPLE # | E69 | E70 | E71 | E72 | E73 |
|---|---|---|---|---|---|
| Polymerization temperature (° C.) | 64 | 73 | 83 | 93 | 105 |
| Ethylene feed rate (g/min) | 2.8 | 2.8 | 2.8 | 2.8 | 2.8 |
| Propylene feed rate (g/min) | 30 | 30 | 30 | 30 | 30 |
| Isohexane feed rate (g/min) | 41 | 41 | 41 | 41 | 41 |
| MCN-3 feed rate (mmol/min) | 0.02077 | 0.02077 | 0.03323 | 0.03323 | 0.06646 |
| Collection time (min) | 20 | 20 | 15 | 20 | 20 |
| Polymer made (gram) | 188.4 | 202.3 | 221 | 338.2 | 451.2 |
| Conversion (%) | 28.7% | 30.8% | 44.9% | 51.5% | 68.7% |
| Catalyst efficiency (kg polymer/kg catalyst) | 847,800 | 910,350 | 828,750 | 951,188 | 634,500 |
| MFR (g/10 min, 2.16 kg, 230° C.) | 1.5 | 2.1 | 15.3 | 32.3 | 316.7 |
| Mn (g/mol) | 177,954 | 141,378 | 89,463 | 68,864 | 35,009 |
| Mw (g/mol) | 369,600 | 296,283 | 191,554 | 150,424 | 82,780 |
| Mz (g/mol) | 610,834 | 490,626 | 329,263 | 262,754 | 152,010 |
| Mw/Mn (−) | 2.08 | 2.10 | 2.14 | 2.18 | 2.36 |
| g'vis (−) | 1.039 | 1.031 | 0.994 | 0.969 | 0.904 |
| Tc (° C.) | | | | 24.7 | 11.3 |
| Tm (° C.) | | | | 59.6 | 57.5 |
| Tg (° C.) | −31.3 | −30.6 | −27.8 | −27.7 | −29.0 |
| Heat of fusion (J/g) | | | | 4.7 | 15.5 |
| Secondary crystallization peak temperature (Tc2) (° C.) | | | | | 3.0 |
| Ethylene content (wt %) | 14.2% | 14.1% | 11.8% | 11.8% | 9.6% |

TABLE 5

| EXAMPLE # | E74 | E75 | E76 | E77 | E78 |
|---|---|---|---|---|---|
| Polymerization temperature (° C.) | 71 | 77 | 83 | 93 | 100 |
| Ethylene feed rate (g/min) | 2.8 | 2.8 | 2.8 | 2.8 | 2.8 |
| Propylene feed rate (g/min) | 30 | 30 | 30 | 30 | 30 |
| Isohexane feed rate (g/min) | 41 | 41 | 41 | 41 | 41 |
| MCN-5 feed rate (mmol/min) | 0.01706 | 0.02133 | 0.02559 | 0.03413 | 0.03413 |
| Collection time (min) | 20 | 20 | 20 | 20 | 20 |
| Polymer made (gram) | 190.7 | 247.6 | 294.4 | 336.2 | 352.1 |
| Conversion (%) | 29.0% | 37.7% | 44.8% | 51.2% | 53.6% |
| Catalyst efficiency (kg polymer/kg catalyst) | 858,150 | 891,360 | 883,200 | 756,450 | 792,225 |
| MFR (g/10 min, 2.16 Kg, 230° C.) | 2.0 | 4.2 | 17.8 | 67.8 | 113.1 |
| Mn (g/mol) | 168,657 | 135,101 | 86,358 | 59,253 | 47,253 |
| Mw (g/mol) | 361,576 | 295,908 | 195,105 | 137,462 | 112,450 |
| Mz (g/mol) | 613,008 | 519,427 | 349,912 | 249,062 | 218,758 |
| Mw/Mn (−) | 2.14 | 2.19 | 2.26 | 2.32 | 2.38 |
| g'vis (−) | 1.011 | 0.994 | 0.969 | 0.939 | 0.917 |
| Tc (° C.) | 8.1 | 11.2 | 16.7 | 23.3 | 25.5 |
| Tm (° C.) | 63.6 | 66.8 | 70.6 | 72.5 | 73.8 |
| Tg (° C.) | −27.3 | −26.7 | −26.7 | −26.9 | −25.6 |
| Heat of fusion (J/g) | 21.8 | 26.6 | 31.7 | 32.5 | 32.9 |
| Secondary crystallization peak temperature (Tc2) (° C.) | 3.0 | 1.6 | | | |
| Ethylene content (wt %) | 10.6% | 10.4% | 9.9% | 9.8% | 9.7% |

As these data show, the inventive catalysts systems produce copolymers having improved properties. The melt flow rate (MFR) are lower than the polymer produced using comparative catalyst at the same polymerization temperature. The inventive catalysts allow for higher polymerization temperatures for a targeted polymer product. The molecular weight distribution of the polymers produced is less than 2.4. The inventive catalysts have catalyst activity higher than 400,000 kg of polymer per kg of catalyst.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A transition metal compound represented by formula (I) or (II):

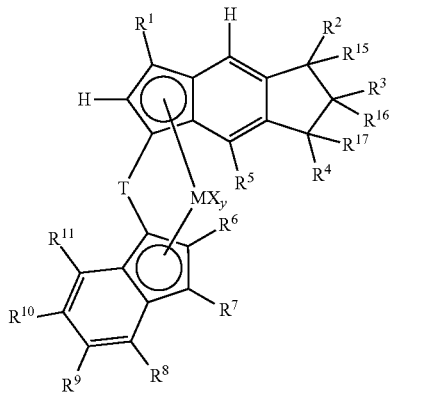

(I)

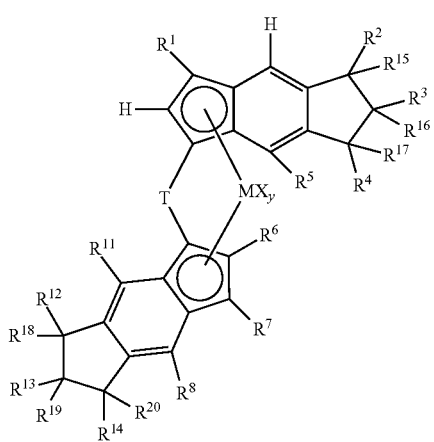

(II)

wherein each of $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$, is independently, hydrogen, halogen, or a monovalent hydrocarbyl radical comprising from one to twenty carbon atoms, silicon atoms, germanium atoms, or a combination thereof, $R^1$ and $R^7$ are independently hydrogen, optionally two or more of $R^2$, $R^3$, $R^4$, $R^5$, $R^{15}$, $R^{16}$, and $R^{17}$, two or more of $R^6$, $R^8$, $R^9$, $R^{10}$, $R^{11}$, $R^{12}$, $R^{13}$, or two or more of $R^6$, $R^8$, $R^9$, $R^{10}$, $R^{11}$ in formula (I), or two or more of $R^6$, $R^8$, $R^{11}$, $R^{12}$, $R^{13}$, $R^{14}$, $R^{18}$, $R^{19}$, $R^{20}$ in formula (II), form a saturated or unsaturated ring comprising three or more carbon atoms, silicon atoms, germanium atoms, or a combination thereof;

M is a group 2, 3 or 4 transition metal;

T is a divalent bridging group of formula (BR):

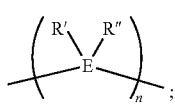

(BR)

wherein E is C, Si, or Ge when n=1;

wherein E is Si and/or Ge when n is 2 or more;

each R' and R" is, independently, hydrogen, halogen, a monovalent substituted or unsubstituted hydrocarbyl radical comprising from one to twenty carbon atoms, or R' and R" form a substituted or unsubstituted cyclic structure, a partially saturated ring system, or a saturated ring system comprising three or more carbon atoms;

y is 1 or 2; and each X is a leaving group independently comprising a halogen, a monovalent hydrocarbyl radical comprising from one to twenty carbon atoms, unsubstituted or substituted with one or more functional groups, wherein the functional group is an amine, imide, amide, ether, alcohol, hydroxide, sulfide, sulfate, phosphide, halide, phosphonate, alkoxide, ester, carboxylate, aldehyde or combination thereof, or two X groups join together to form a $C_4$ to $C_{62}$ cyclic or polycyclic ring structure when y=2.

2. The transition metal compound of claim 1, wherein $R^1$ is hydrogen, $R^5$ is hydrogen, or $R^1$ and $R^5$ are hydrogen.

3. The transition metal compound of claim 1, wherein when represented by formula (I), nine or more of $R^1$, $R^2$, $R^3$, $R^4$, $R^5$, $R^6$, $R^7$, $R^8$, $R^9$, $R^{10}$, $R^{15}$, $R^{16}$, and $R^{17}$ are hydrogen; or when represented by formula (II), eleven or more of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ are hydrogen.

4. The transition metal compound of claim 1, wherein E is Si; each of R' and R" is independently, a monovalent alkyl radical having from 1 to 4 carbon atoms, a benzyl radical, or a monovalent aromatic radical having from 6 to 10 carbon atoms; and n is 1.

5. The transition metal compound of claim 1, wherein when represented by formula (I), each of $R^1$, $R^2$, $R^3$, $R^4$, $R^5$, $R^6$, $R^7$, $R^8$, $R^9$, $R^{10}$, $R^{15}$, $R^{16}$, and $R^{17}$ is hydrogen;

M is a group 4 transition metal;

E is Si;

each of R' and R' is, independently, a monovalent $C_1$ to $C_4$ alkyl radical;

n is 1; and y is 2.

6. The transition metal compound of claim 1, wherein when represented by formula (I):

i) $R^1$ is hydrogen;

ii) $R^5$ is hydrogen; or iii) each of $R^1$, $R^2$, $R^3$, $R^4$, $R^5$, $R^6$, $R^7$, $R^{10}$ $R^{11}$, $R^{15}$, $R^{16}$, and $R^{17}$ is hydrogen;

$R^8$, and $R^9$ are joined together forming a 6 membered aromatic ring;

M is a group 4 transition metal;

E is Si;

each of R' and R" is, independently, a monovalent $C_1$ to $C_4$ alkyl radical;

n is 1; and y is 2.

7. The transition metal compound of claim 1, wherein when represented by formula (II), each of $R^1$, $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, $R^{17}$, $R^{18}$, $R^{19}$ and $R^{20}$ is hydrogen;

M is a group 4 transition metal;

E is Si;

each of R' and R" is, independently, a monovalent $C_1$ to $C_4$ alkyl radical;

n is 1; and y is 2.

8. The transition metal compound of claim 1, wherein when represented by formula (II), each of $R^1, R^2, R^3, R^4, R^6, R^7, R^8, R^{11}, R^{12}, R^{13}, R^{14}, R^{15}, R^{16}, R^7, R^{18}, R^{19}$ and $R^{20}$ is hydrogen;

$R^5$ is a phenyl moiety;

M is a group 4 transition metal;

E is Si;

each of R' and R" is, independently, a monovalent $C_1$ to $C_4$ alkyl radical;

n is 1; and y is 2.

9. The transition metal compound of claim 1, wherein M is Hf.

\* \* \* \* \*